Aug. 18, 1953  N. E. SHOCKEY ET AL  2,648,842
MECHANISM FOR MAKING WIRE REINFORCED
FABRIC SPRING LINERS OR THE LIKE
Filed May 17, 1950  16 Sheets-Sheet 1

INVENTORS
NEWTON E. SHOCKEY
HOWARD WENDALL WILKINS
BY
Burton E Parker
ATTORNEYS

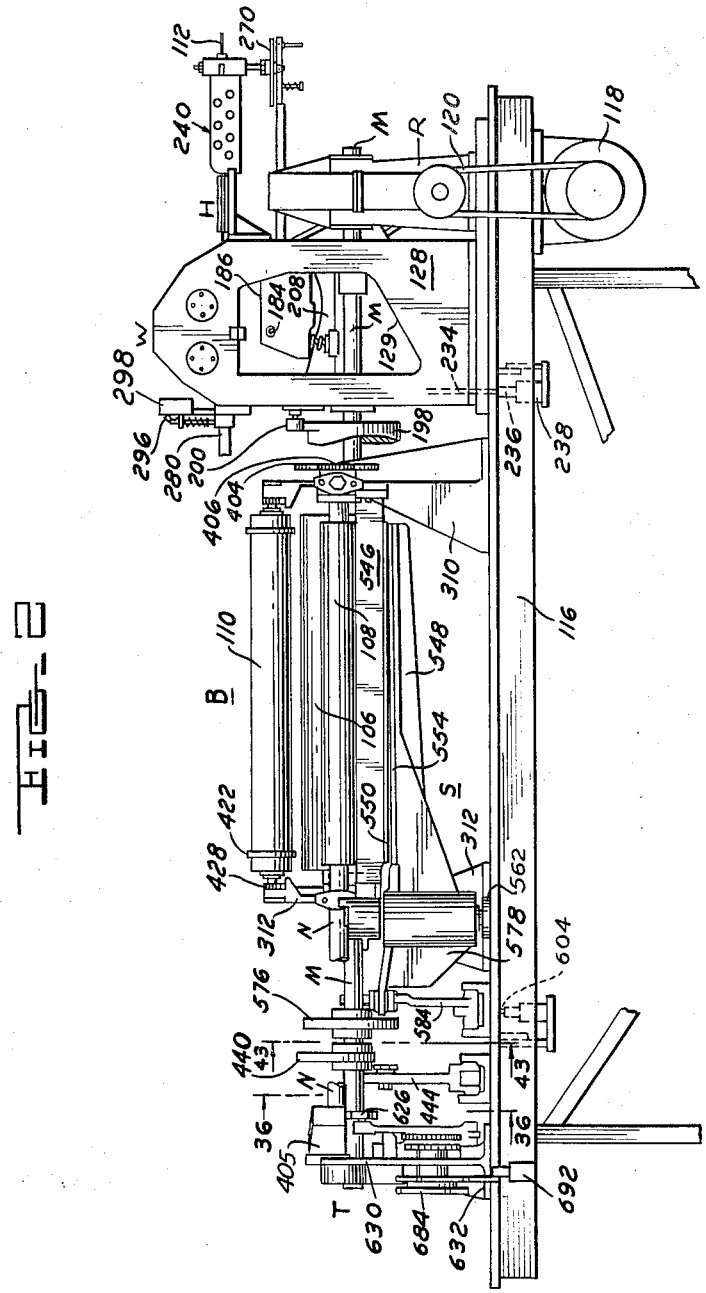

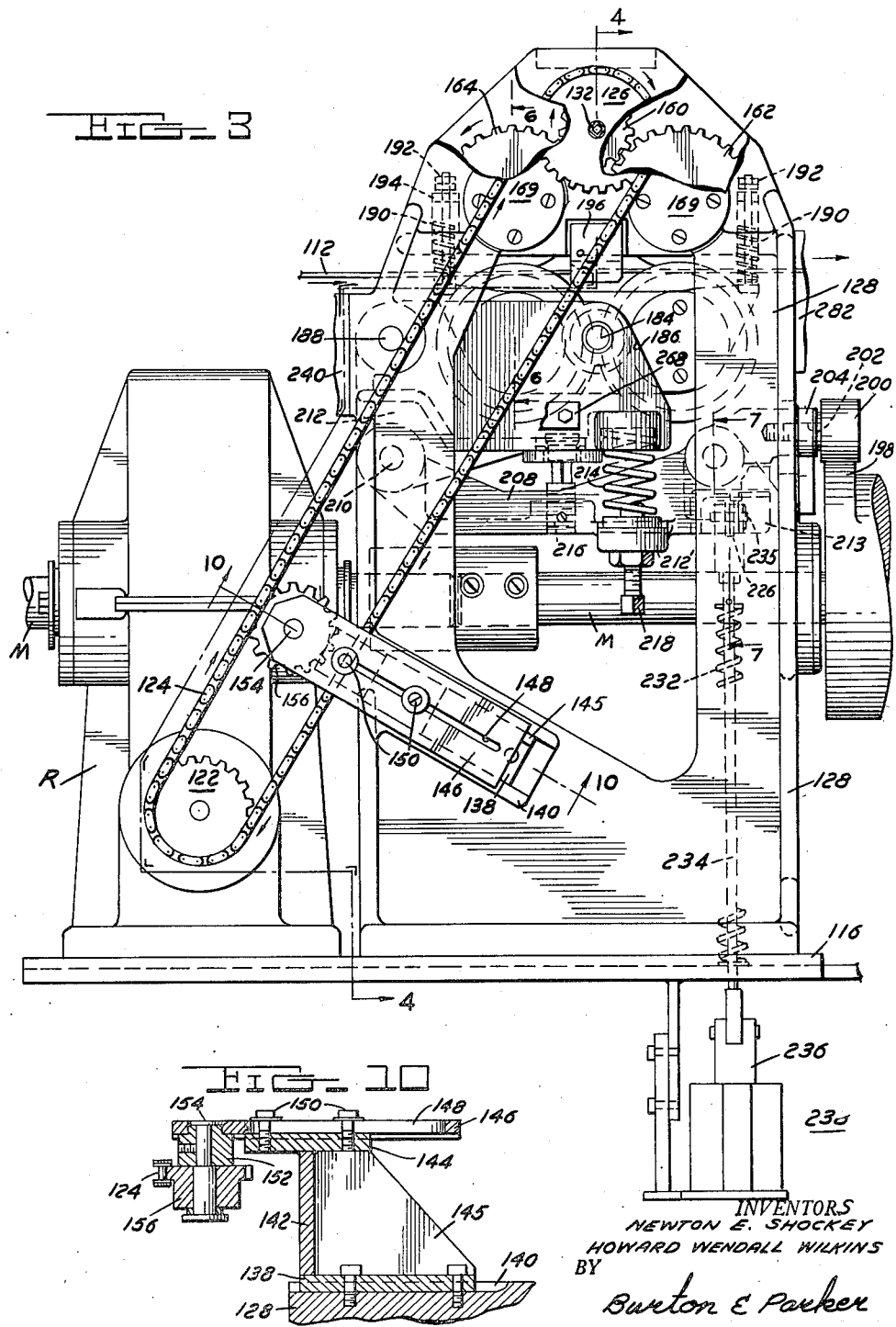

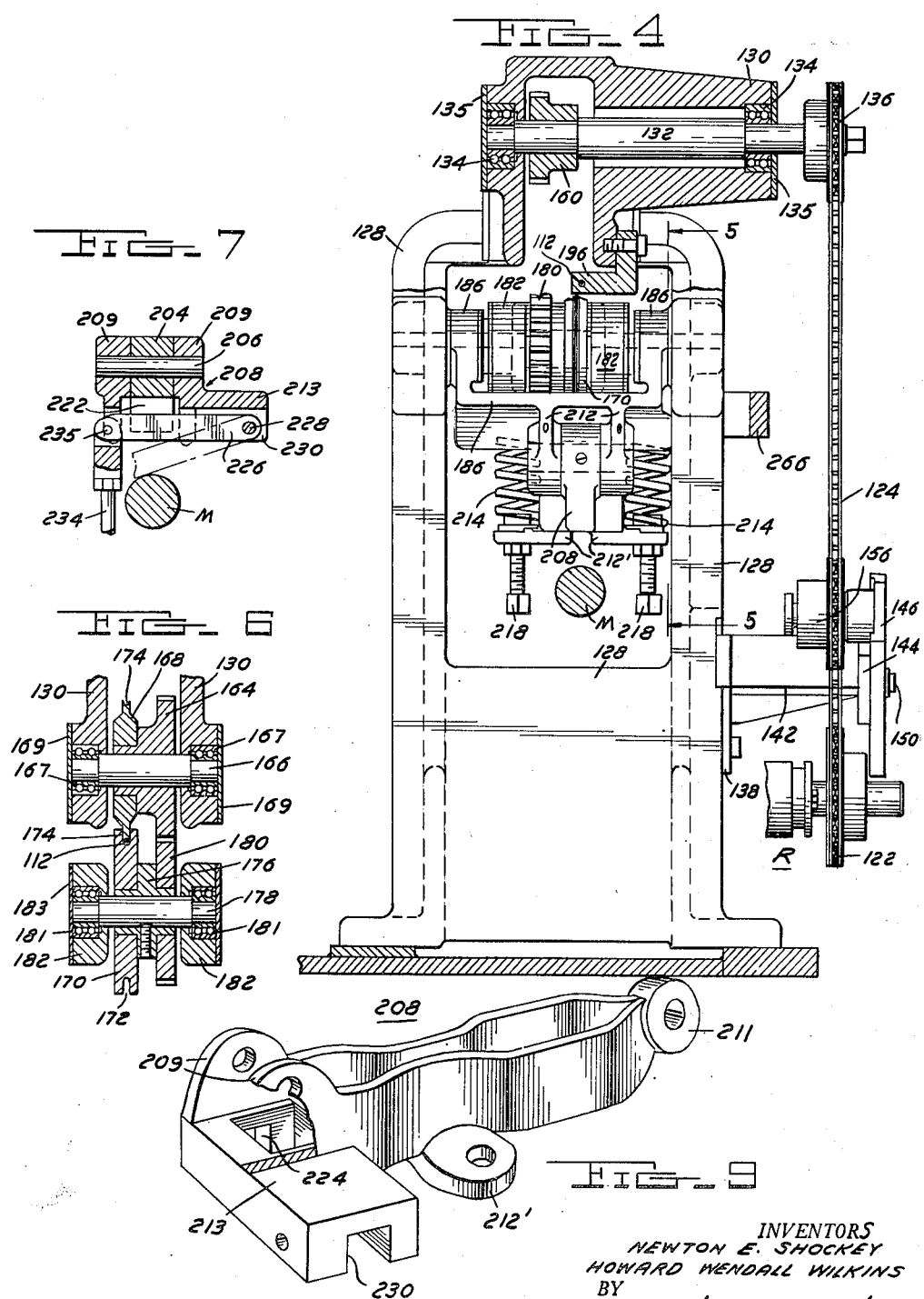

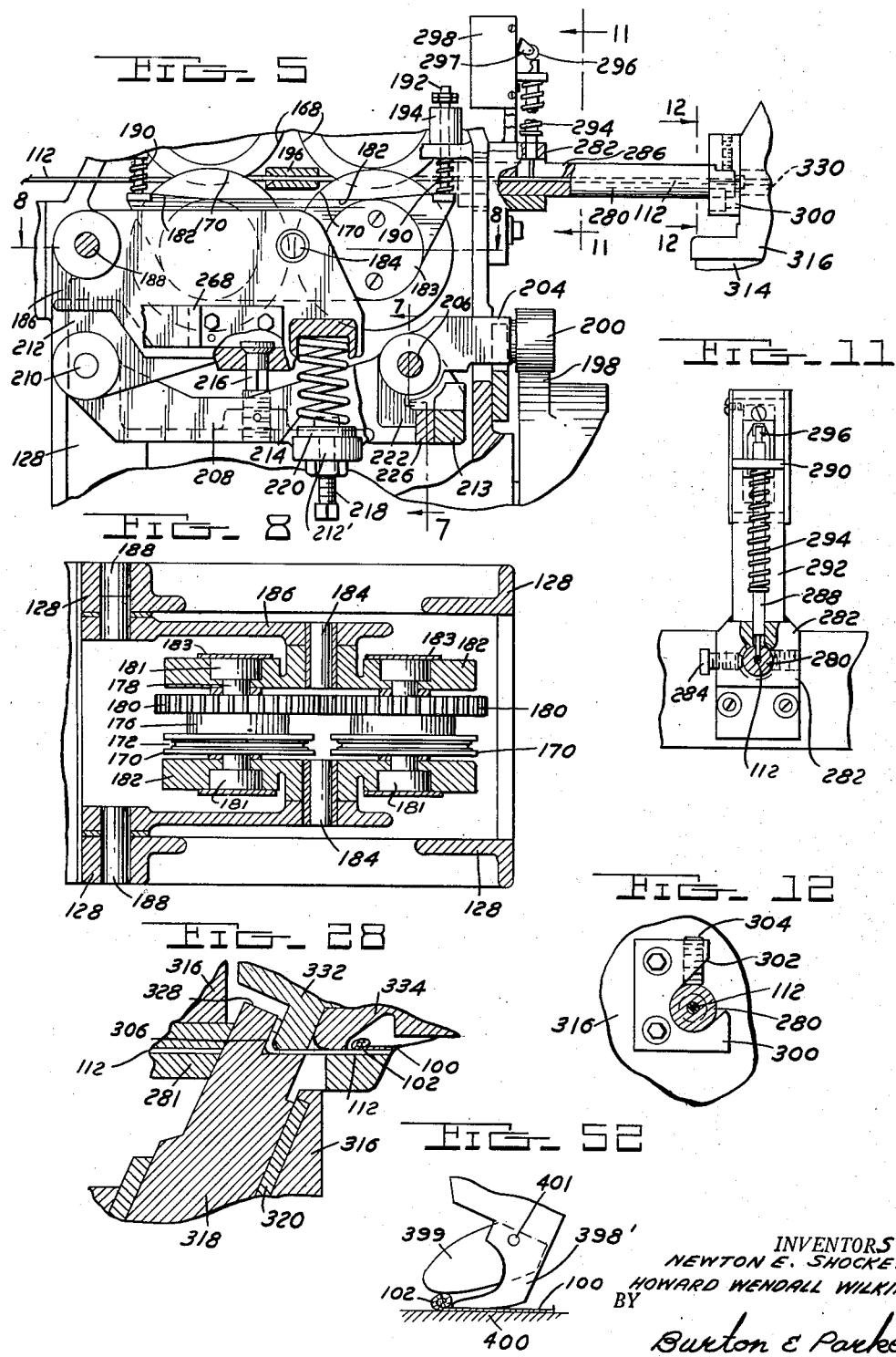

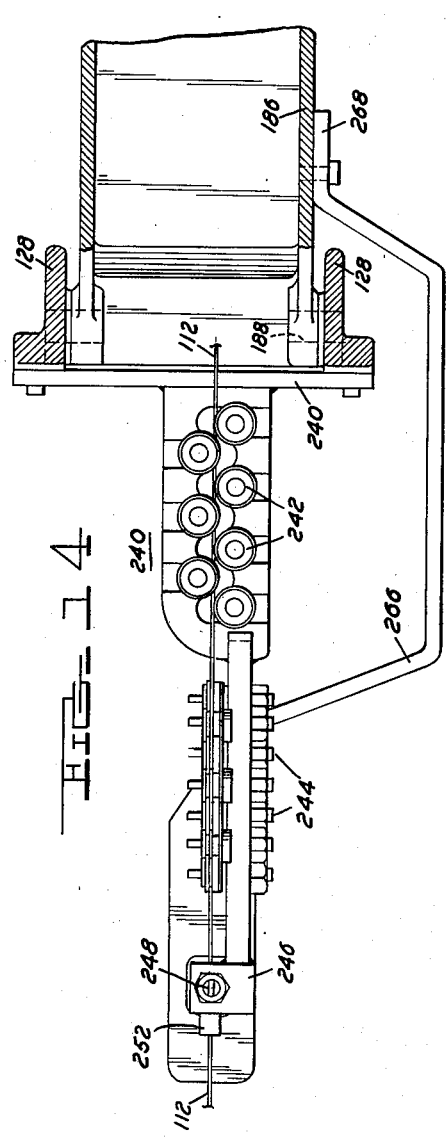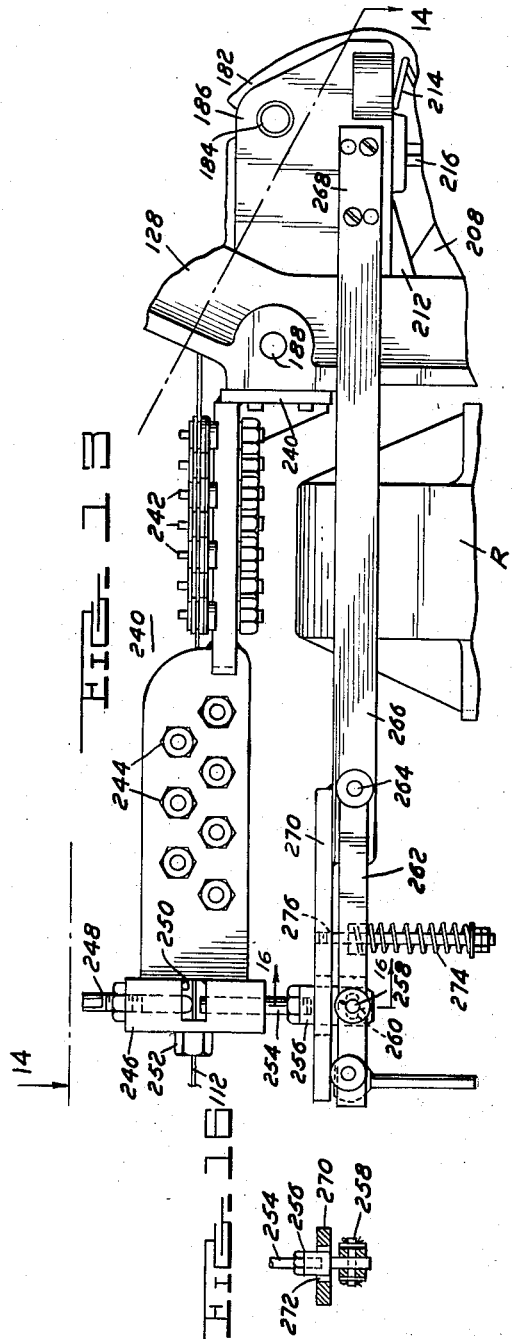

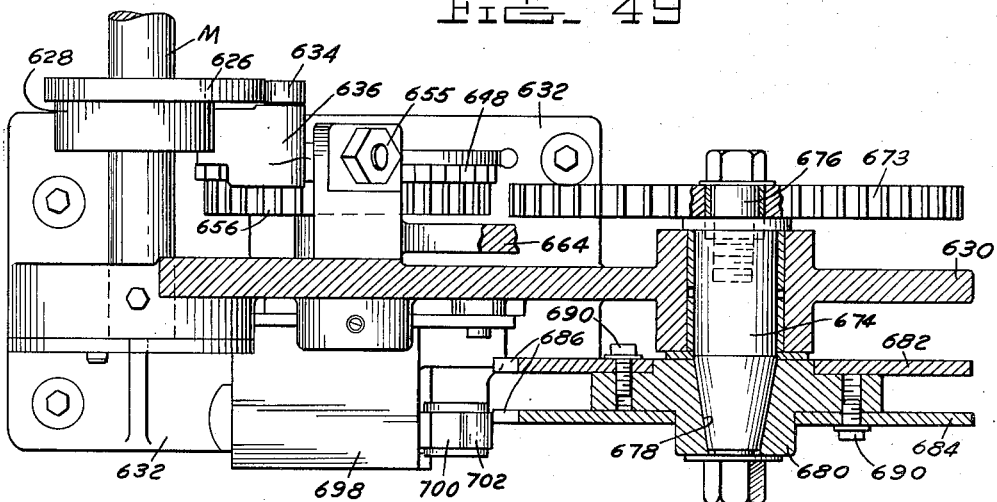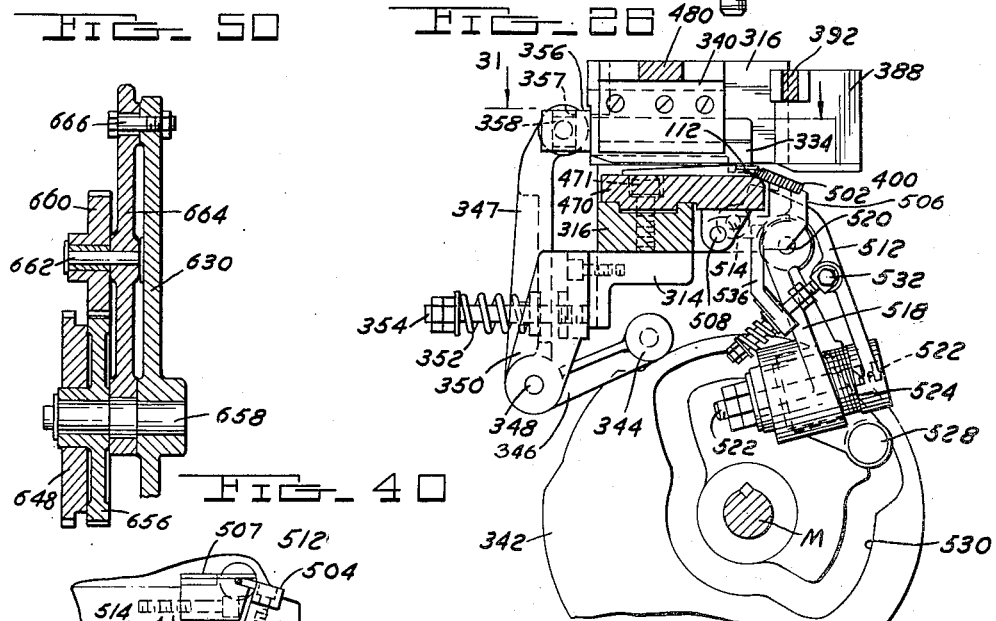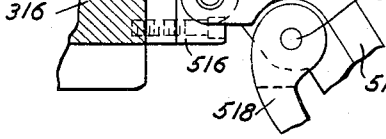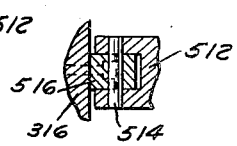

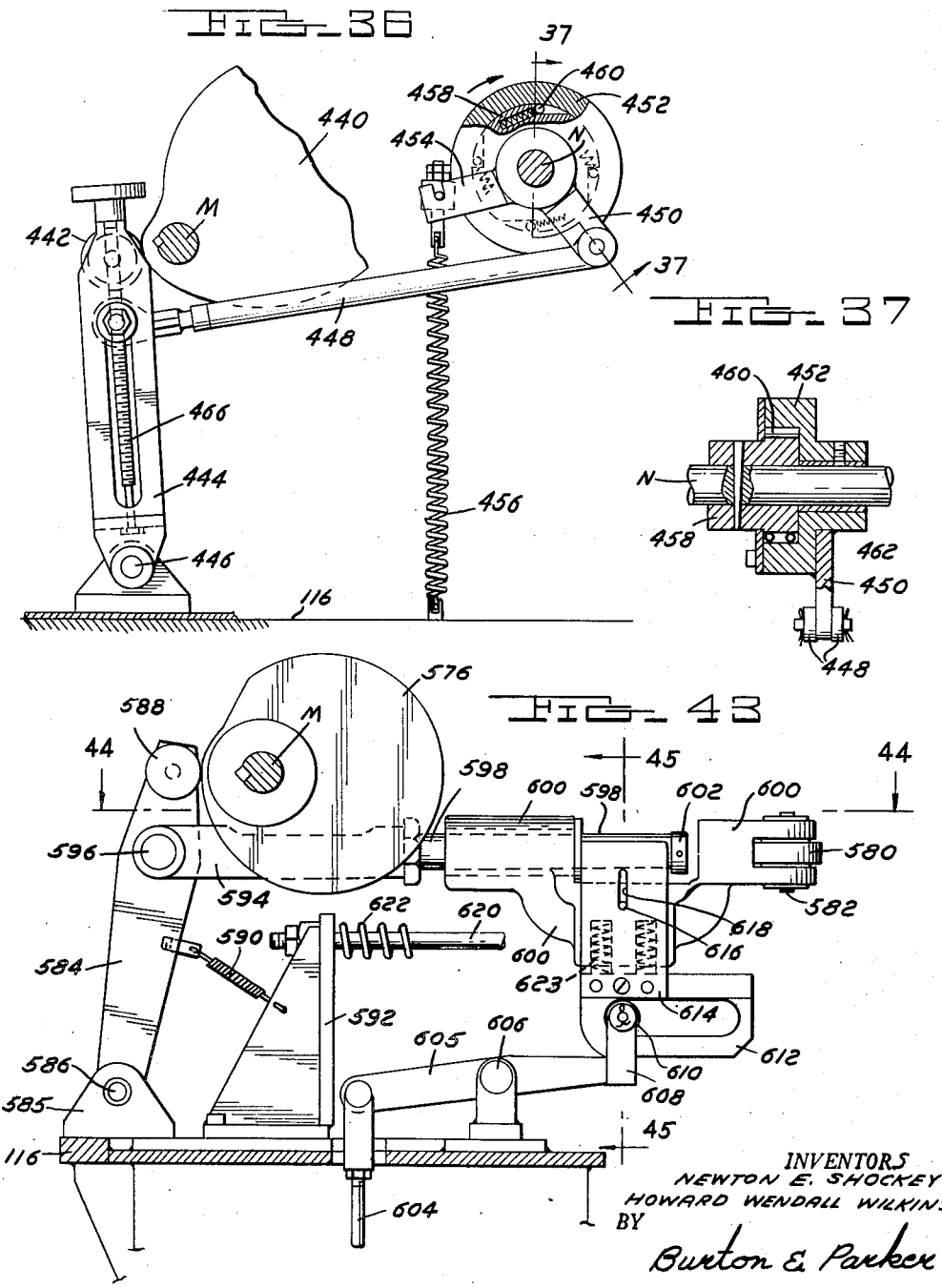

Aug. 18, 1953

N. E. SHOCKEY ET AL 2,648,842

MECHANISM FOR MAKING WIRE REINFORCED
FABRIC SPRING LINERS OR THE LIKE

Filed May 17, 1950

INVENTORS
NEWTON E. SHOCKEY
HOWARD WENDALL WILKINS
BY
Burton & Parker
ATTORNEYS

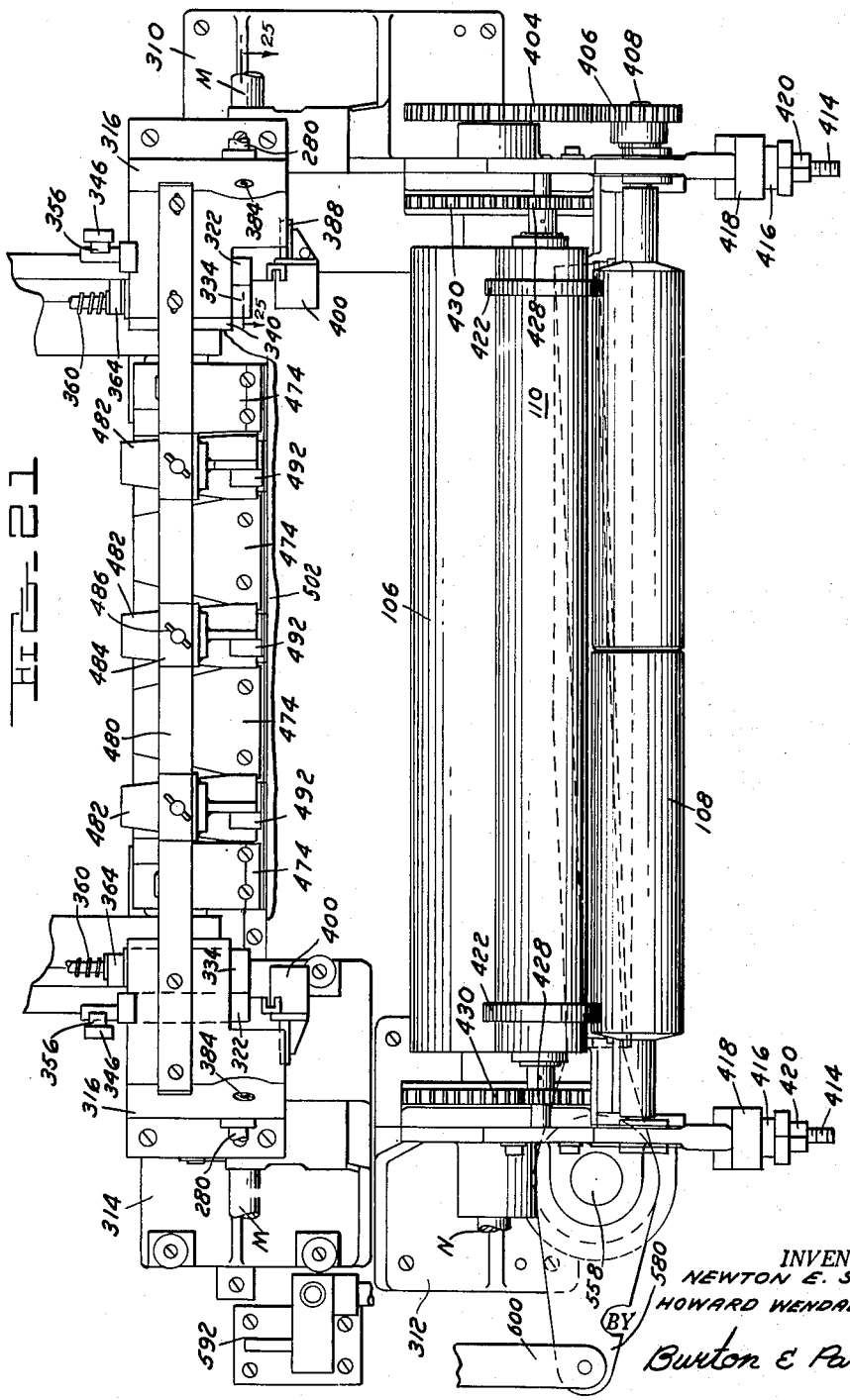

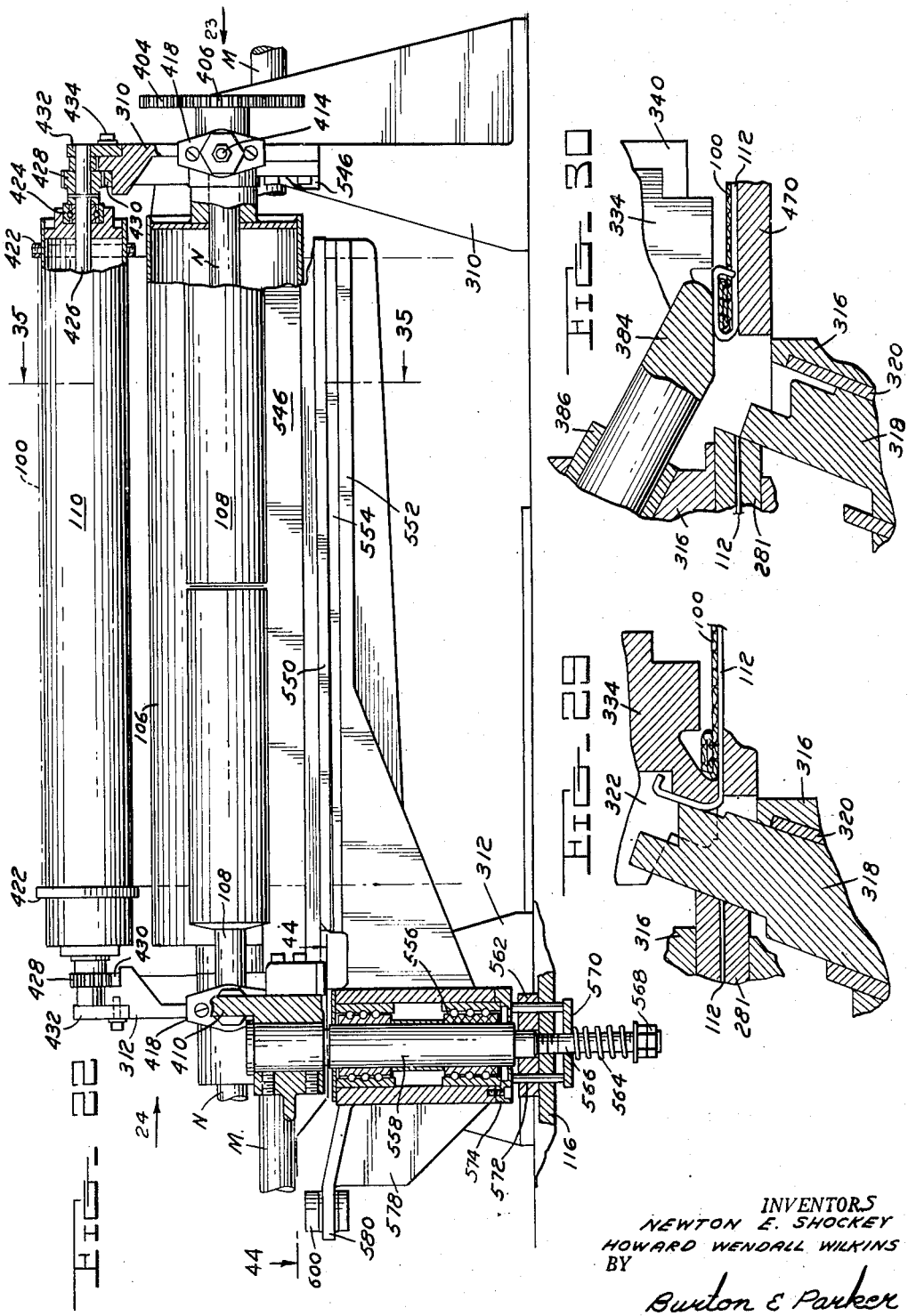

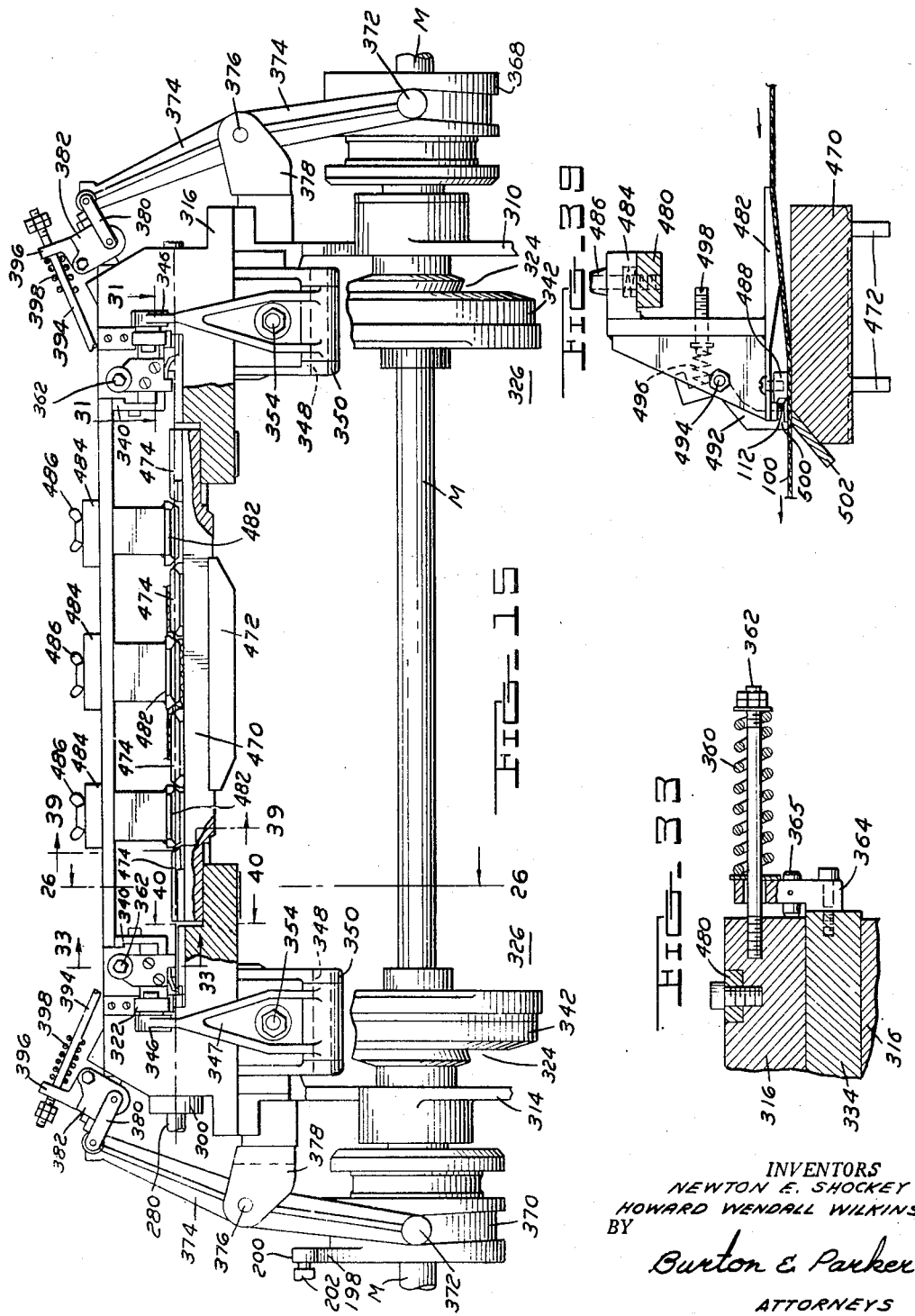

Aug. 18, 1953     N. E. SHOCKEY ET AL     2,648,842
MECHANISM FOR MAKING WIRE REINFORCED
FABRIC SPRING LINERS OR THE LIKE
Filed May 17, 1950                    16 Sheets-Sheet 13
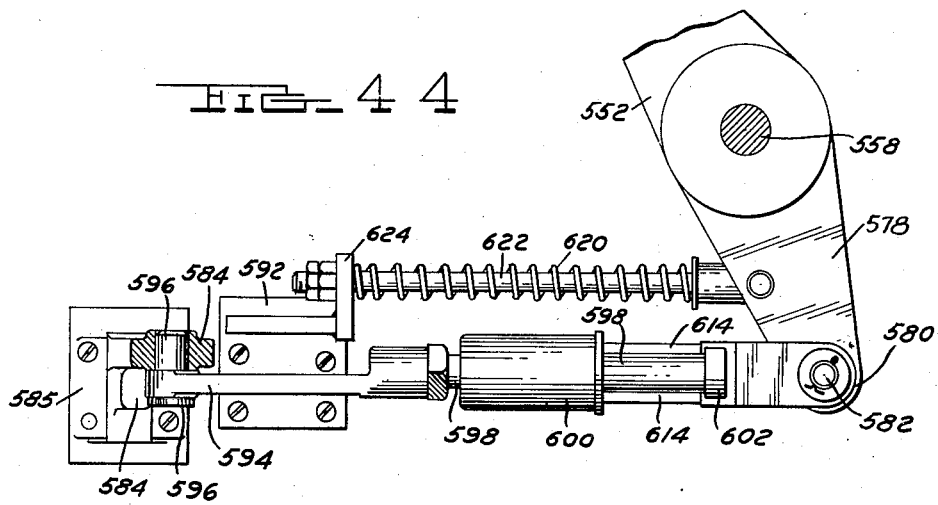
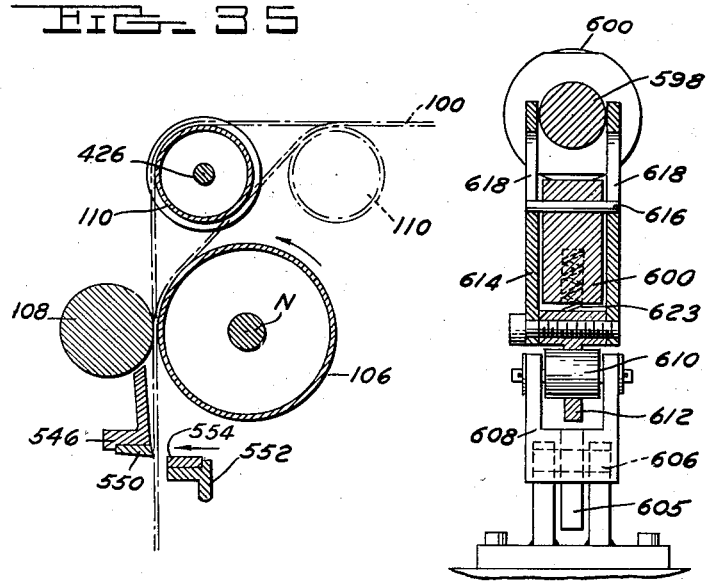
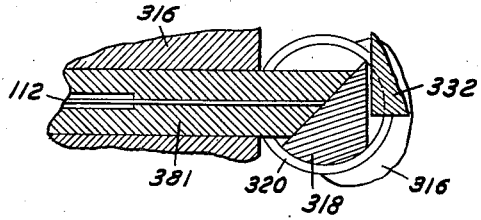
INVENTORS
NEWTON E. SHOCKEY
HOWARD WENDALL WILKINS
BY
*Burton & Parker*
ATTORNEYS

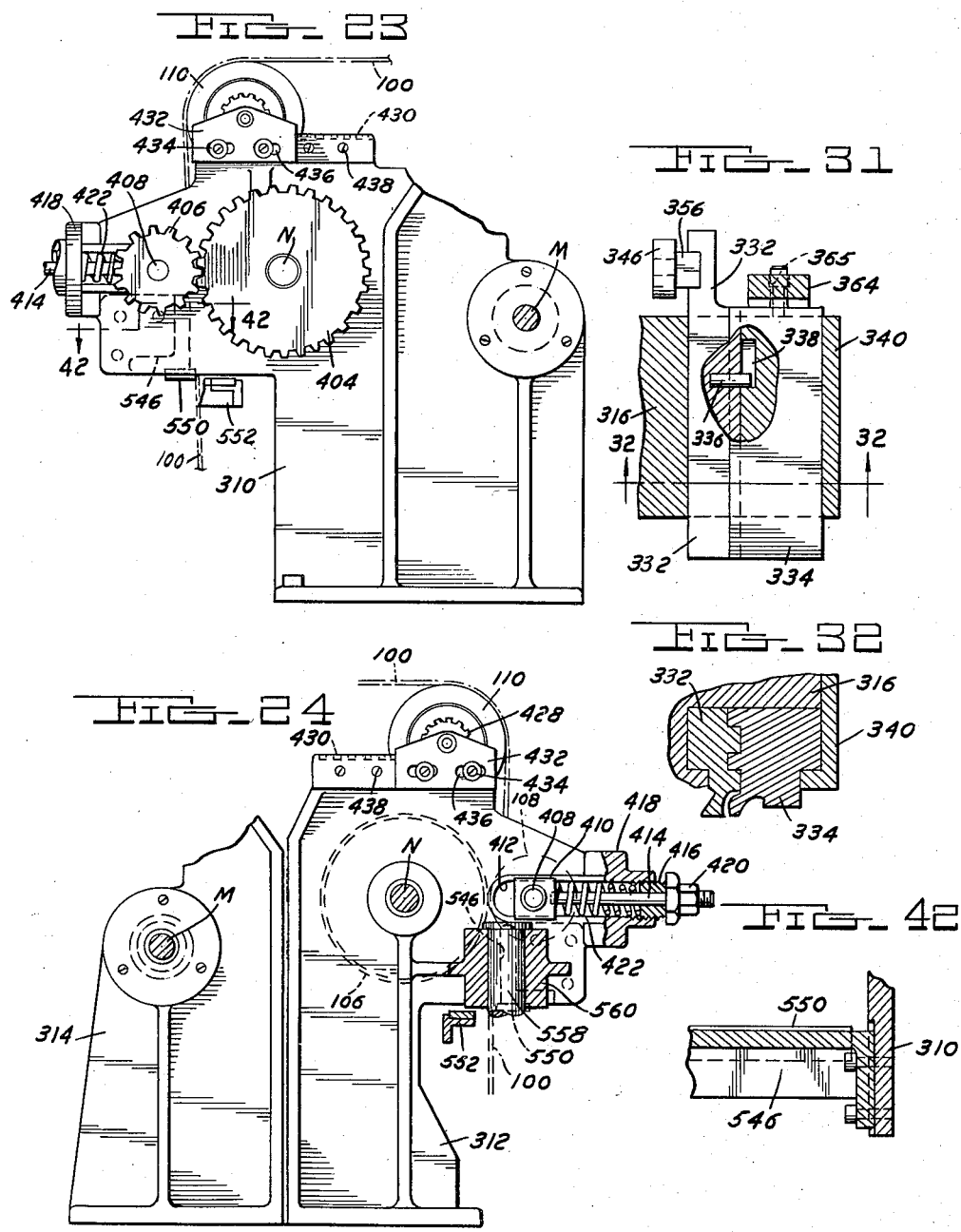

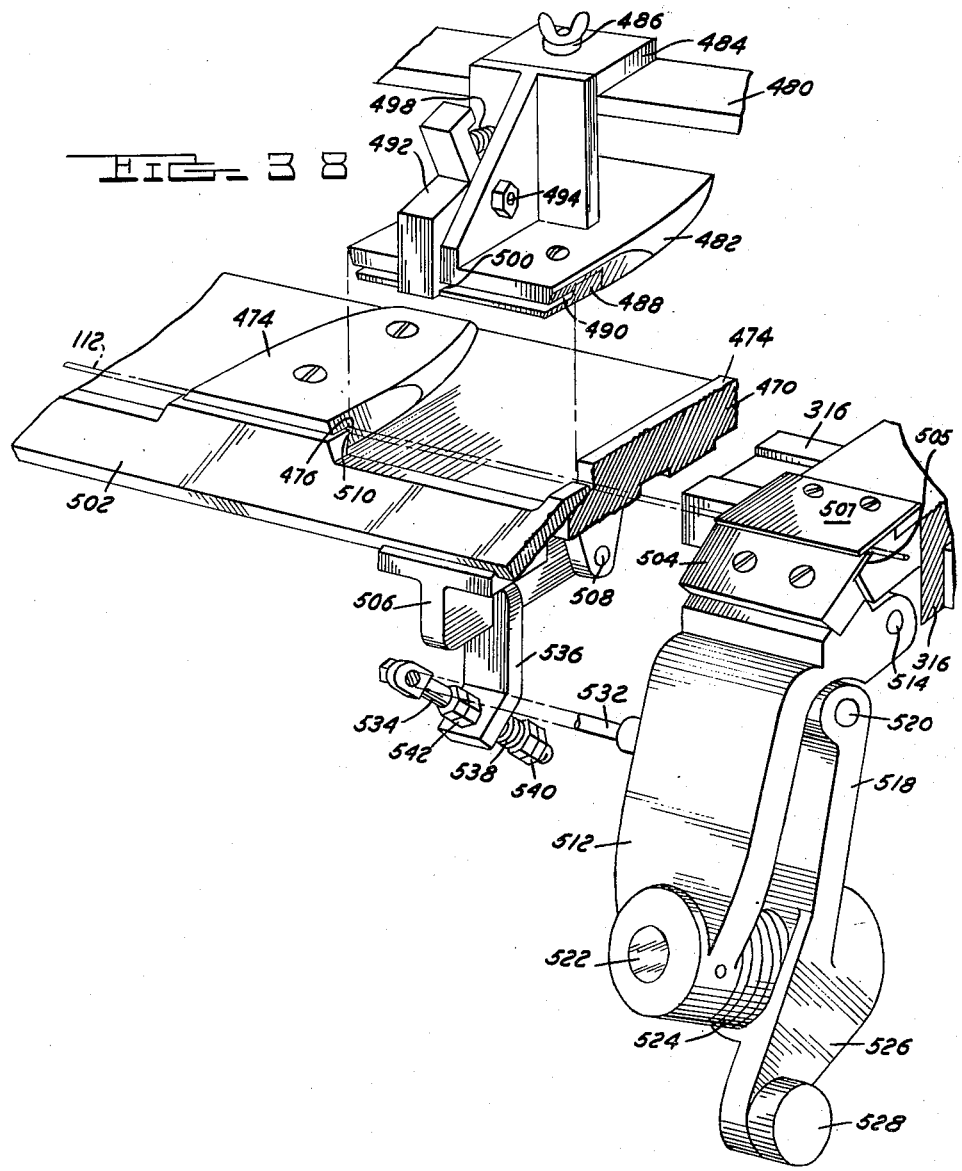

Aug. 18, 1953
N. E. SHOCKEY ET AL
2,648,842
MECHANISM FOR MAKING WIRE REINFORCED
FABRIC SPRING LINERS OR THE LIKE
Filed May 17, 1950
16 Sheets-Sheet 16
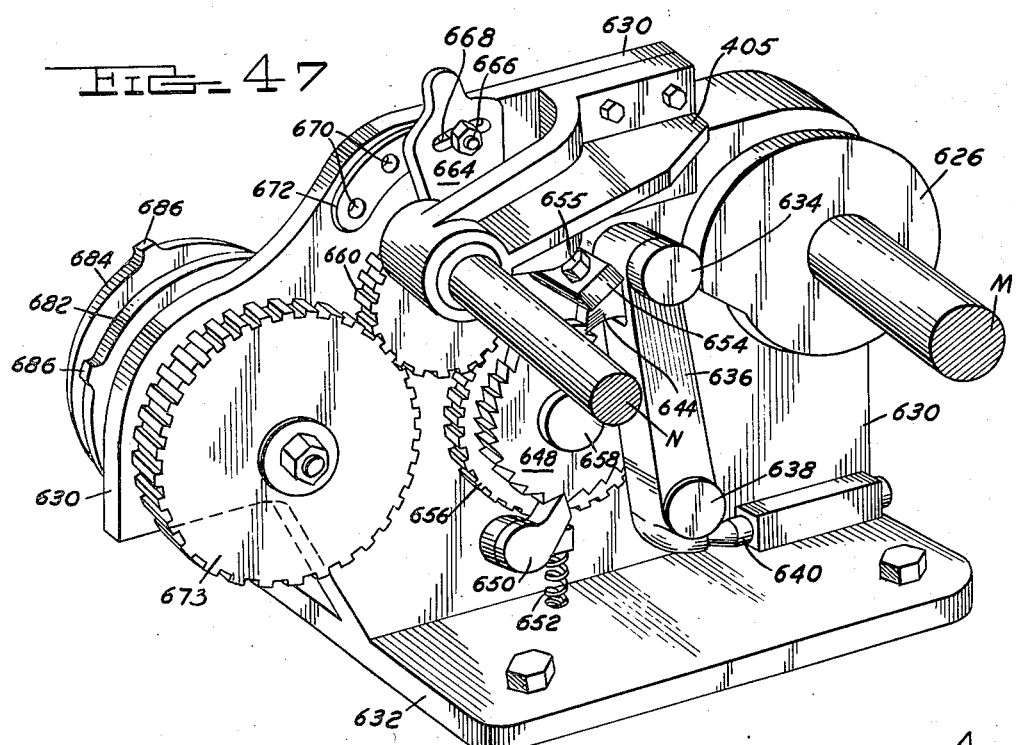
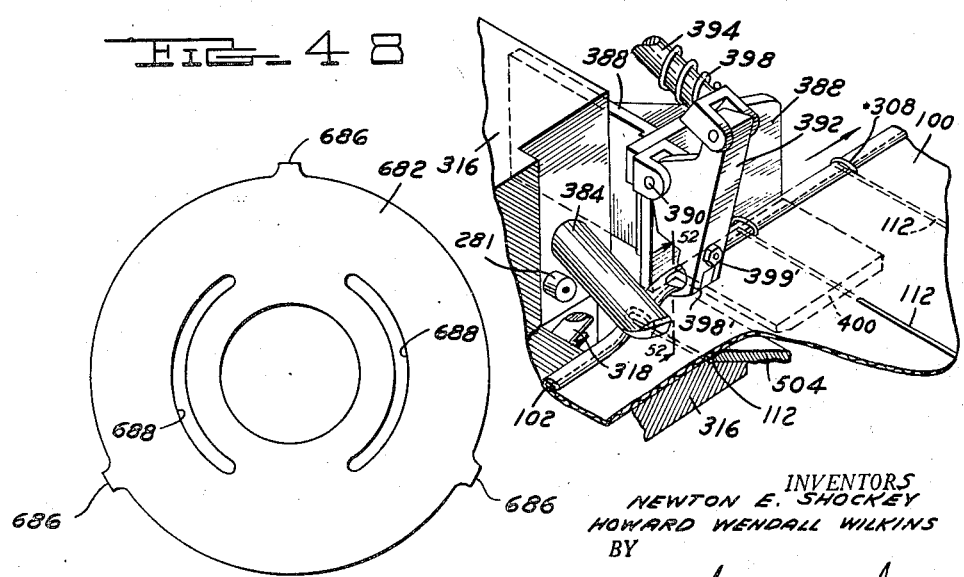
INVENTORS
NEWTON E. SHOCKEY
HOWARD WENDALL WILKINS
BY
Burton & Parker
ATTORNEYS Patented Aug. 18, 1953

2,648,842

UNITED STATES PATENT OFFICE 2,648,842

MECHANISM FOR MAKING WIRE REINFORCED FABRIC SPRING LINERS OR THE LIKE

Newton E. Shockey, Detroit, and Howard Wendall Wilkins, Centerline, Mich., assignors to Van Dresser Specialty Corporation, Van Dyke, Mich., a corporation of Michigan Application May 17, 1950, Serial No. 162,496

18 Claims. (Cl. 1—200)

This invention relates to improvements in mechanism for making wire reinforced fabric spring liners or the like.

An object is to provide a machine for forming wire reinforced spring liners or the like wherein reinforcing wires are threaded transversely through a fabric web, have their ends bent over longitudinal folds or reinforcements formed in the web, and the web is then severed into strips or sections to form the liners.

Another object is to provide a machine whereby a web of fabric, such as burlap, may be advanced through the machine in a step by step manner and during the pauses between successive steps reinforcing wires are threaded through the web, these wires are cut off, the ends of the cut off wire sections are bent over parts of the web, and the web itself is cut up into strips of the length required and containing the desired number of reinforcing cross wires.

The wire section thrust through the web and cut off has both ends bent and shaped to grip the reinforcing marginal folds along both margins of the web. This wire section is not only cut off at its inner end from the roll of wire of which it originally formed a part but the outer end of the section is also cut off. This is for the purpose of insuring accuracy of wire length and accuracy of end bends in the wire.

Another object is to provide such a machine wherein the spacing of the wires and the length of the cut off sections of the web may be regulated as desired.

Another object is to provide a machine wherein the parts which carry out the several steps are coordinated in timed relationship with each other so that the web of fabric is advanced in a step by step manner with pauses between successive steps; wire feed mechanism functions to feed wire transversely through the web during the pauses in the advance of the web, such operations continuing repetitively until a selected number of successive wires have been fed through the web; mechanism then automatically functions to withhold the feeding of wire during that pause which immediately follows the selected number of pauses during which wire has been fed through the fabric and the web is advanced a step without any wire being fed therethrough; the mechanism then continues to function as before feeding wire through the web during each of a selected number of pauses until a second pause is reached during which no wire is fed. This fabric web with the groups of parallel wires threaded therethrough and separated as to groups by intervals of greater length than the intervals that separate successive wires in each group may then be cut into strips through these intervals of greater length between the groups.

Another object is to provide a machine of the character described wherein power driven fabric feed mechanism operates to advance a fabric web in successive steps with pauses between the steps; wire feeding mechanism operates in timed relationship therewith to thrust a wire transversely through the web during pauses in its advance; wire holding mechanism and wire cut off and end shaping mechanism operate in timed relationship therewith to grip and hold the section of wire thrust through the web and to cut off such section and to bend the ends thereof over parts of the web.

More particularly, the machine includes a rotatably driven shaft and fabric advancing mechanism operatively coupled with the shaft to respond to each revolution thereof to advance the fabric web a single step with a pause following each step, wire feed mechanism operatively coupled with the shaft to respond to each revolution thereof to thrust a wire transversely through the web during the pause following each step of a determined number of steps, and wire cut off and shaping mechanism operatively coupled with the web to respond to each revolution thereof to cut off the section of wire thrust through the web and to bend the ends of the section over selected parts of the web, and web severing mechanism operatively coupled with the shaft to respond to a determined succession of revolutions thereof to sever the web during a selected pause in its advance.

Such shaft is shown as provided with a plurality of cams so relatively formed and arranged and coupled with the several operating devices of the machine that the fabric feed mechanism responds once during each revolution of its cam to advance the web a single step and to provide a pause following such step, the wire feed mechanism responds during each revolution of its cam to thrust a wire through the web during the web pause following each step in advance of a selected number of steps, the wire cut off and end shaping mechanism respond to each revolution of its cam to cut off each section of wire thrust through the web and bend the ends over the margins of the web, and wire feed control means responds to the revolution of its cam to render the wire feed mechanism inoperative for that revolution of the shaft following a determined selected number of shaft revolutions, and web severing mechanism responds to the revolution of its cam to sever the web following said selected number of shaft revolutions.

Another object is to provide in a machine of the character described fabric stretching mechanism functioning in synchronism with the wire cut off and end shaping mechanism adapted to grasp those parts of the fabric over which the ends of the wire are to be bent and hold the same during the bending of the wire thereover. Such fabric stretching mechanism also stretches the web of fabric transversely so that when the ends of the wire are bent thereover the wires hold the same in the desired position.

Another object is to provide in a machine having wire cut off and end shaping mechanism of the character described two die members functioning as part of and in synchronism with the wire cut off and end shaping means and adapted to be projected across the path of advance of the wire so that the wire is bent thereover by said shaping means and which dies are adapted to be withdrawn out of the way to permit completion of the bending of the wire and the clenching thereof through the web.

Another object is to provide, in a machine of the class described having a rotatably driven cam shaft provided with a plurality of cams one for each of the operating devices of the machine, such as the fabric feed, wire feed, wire cut off and end shaping means, skip feed for the wire feed mechanism, and fabric severing mechanism, certain mechanisms which respond to each rotation of their cams to perform their functions and other mechanisms which respond only to a predetermined number of revolutions of their cams to perform their functions. The mechanisms which respond to a predetermined number of revolutions of their cams to perform their functions may respond by having a part interposed in the driven connection from the shaft which part renders the connection operative, or by having a part withdrawn from its driving relationship in the driven connection from the shaft which withdrawal renders the driving connection inoperative.

In the drawings:

Fig. 1 (Sheet 1) is a schematic illustration of the operation designed to be carried out by the machine of this application;

Fig. 2 (Sheet 2) is a front elevation of a machine assembly which is adapted to perform the operation illustrated in Fig. 1;

Fig. 3 (Sheet 3) is a back elevation of the wire feed mechanism portion of the machine;

Fig. 4 (Sheet 4) is a vertical section taken on line 4—4 of Fig. 3;

Fig. 5 (Sheet 5) is a vertical section taken on the line 5—5 of Fig. 4 showing the structure partly in elevation;

Fig. 6 (Sheet 4) is a vertical section taken on the line 6—6 of Fig. 3, being a fragment of the wire feed mechanism;

Fig. 7 (Sheet 4) is a vertical section taken on the line 7—7 of Fig. 3;

Fig. 8 (Sheet 5) is a horizontal sectional view looking downward taken on the line 8—8 of Fig. 5;

Fig. 9 (Sheet 4) is a perspective of the sub-frame portion of the wire feed assembly shown in Figs. 4 and 5;

Fig. 10 (Sheet 3) is a cross section taken on the line 10—10 of Fig. 3 showing the mounting of the adjustment for the chain tightener for the wire feed mechanism;

Fig. 11 (Sheet 5) is a vertical sectional view taken on the line 11—11 of Fig. 5 showing the wire buckling safety switch control mechanism and the bracket support for one end of the wire guide sleeve extending between the wire feed mechanism and the main portion of the machine partly in elevation;

Fig. 12 (Sheet 5) is a vertical sectional view taken on the line 12—12 of Fig. 5 showing the bracket support at the machine for the other end of the wire guide sleeve;

Fig. 13 (Sheet 6) is a side elevation of the wire straightener mechanism associated with the wire feed;

Fig. 14 (Sheet 6) is a top plan view of the wire straightener mechanism shown in Fig. 13;

Fig. 15 (Sheet 12) is a fragmentary back elevation showing the intermediate portion of the main shaft provided with its cams and showing the upper and lower bridges and the pleating shoes carried thereby between which the fabric web is passed to pleat the same;

Fig. 16 (Sheet 6) is a section taken on the line 16—16 of Fig. 13;

Fig. 17 (Sheet 1) illustrates diagrammatically the cutting of a wire section;

Fig. 18 (Sheet 1) illustrates diagrammatically the first bending step performed on the cut off end of the wire;

Fig. 19 (Sheet 1) illustrates diagrammatically the second bending step performed on the cut off end of the wire;

Fig. 20 (Sheet 1) illustrates diagrammatically the final bending and clenching step performed on the wire.

Fig. 21 (Sheet 10) is a top plan view of the main portion of the machine indicated by the letter B in Fig. 2;

Fig. 22 (Sheet 11) is a front elevation of the machine shown in top plan view in Fig. 21;

Fig. 23 (Sheet 14) is an end elevation looking in the direction of the arrow 23 in Fig. 22;

Fig. 24 (Sheet 14) is an end elevation looking at the opposite end of the machine and in the direction of the arrow 24 in Fig. 22;

Fig. 25 (Sheet 9) is a vertical sectional view taken on the line 25—25 of Fig. 21 looking toward the front of the machine with the #1 and #2 dies withdrawn rearwardly;

Fig. 26 (Sheet 7) is a vertical sectional view taken on the line 26—26 of Fig. 15 looking in the direction of the arrow;

Fig. 27 (Sheet 13) is a fragmentary horizontal sectional view taken on the line 27—27 of Fig. 25;

Fig. 28 (Sheet 5) is a fragmentary sectional view taken on the same section line of Fig. 21 as is Fig. 25 showing the die members and the wire cut off plunger elevated part way having cut off the wire and completed the first bending operation;

Fig. 29 (Sheet 11) is a fragmentary sectional view taken on the same line as Fig. 28 showing the wire cut off and end shaping plunger at the uppermost end of its stroke;

Fig. 30 (Sheet 11) is a fragmentary sectional view taken on the same line as Fig. 28 showing the wire cut off plunger withdrawn downwardly and the #1 and #2 dies withdrawn rearwardly and the bending and clenching of the wire completed;

Fig. 31 (Sheet 14) is a horizontal fragmentary sectional view taken on the line 31—31 of Fig. 15;

Fig. 32 (Sheet 14) is a vertical sectional view taken on the line 32—32 of Fig. 31;

Fig. 33 (Sheet 12) is a vertical sectional view taken on the line 33—33 of Fig. 15;

Fig. 34 (Sheet 16) is a fragmentary perspective of the fabric stretching device adapted to engage the marginal fold of the fabric and stretch the same;

Fig. 35 (Sheet 13) is a vertical sectional view taken on the line 35—35 of Fig. 22;

Fig. 36 (Sheet 8) is an elevation of the fabric feed roll actuating mechanism taken on the vertical section line 36—36 of Fig. 2;

Fig. 37 (Sheet 8) is a vertical sectional view taken on the section line 37—37 of Fig. 36;

Fig. 38 (Sheet 15) is a perspective of separated fragments of upper and lower bridge members and cooperating fluting shoes;

Fig. 39 (Sheet 12) is a fragmentary vertical sectional view taken on the line 39—39 of Fig. 15 through the upper and lower bridge assemblies;

Fig. 40 (Sheet 7) is a cross sectional fragmentary view taken on the line 40—40 of Fig. 15;

Fig. 41 (Sheet 7) is a fragmentary horizontal sectional view taken on the section line 41—41 of Fig. 40;

Fig. 42 (Sheet 14) is a fragmentary horizontal sectional view taken on the section line 42—42 of Fig. 23 looking down on the end support for the stationary shear blade;

Fig. 43 (Sheet 8) is an elevation of the cam operated mechanism for the movable blade of the shears taken on the section line 43—43 of Fig. 2;

Fig. 44 (Sheet 13) is a fragmentary plan taken on the section line 44—44 of Fig. 43 looking down on the movable blade operating linkage;

Fig. 45 (Sheet 13) is a vertical sectional view taken on the section line 45—45 of Fig. 43;

Fig. 46 (Sheet 9) is an end elevation taken from the left end of Fig. 2 showing the operating mechanism and its support for the two timing switches mounted on the bed plate of the machine.

Fig. 47 (Sheet 16) is a perspective of the operating mechanism and its support for the two timing switches taken from the opposite side as compared to the view of Fig. 46;

Fig. 48 (Sheet 16) is a side elevation of one of the toothed plates of the timing switch operating mechanism;

Fig. 49 (Sheet 7) is a horizontal sectional view taken on the section line 49—49 of Fig. 46;

Fig. 50 (Sheet 7) is a vertical sectional view taken on the line 50—50 of Fig. 46;

Fig. 51 (Sheet 9) is a vertical sectional view taken on the line 51—51 of Fig. 46;

Fig. 52 (Sheet 5) is a vertical sectional view taken on the section line 52—52 of Fig. 34 showing the web stretcher foot in elevation.

In Fig. 1 the operation of the machine is illustrated schematically. Burlap or other usable fabric 100 is withdrawn from a suitably supported roll 101 and fed lengthwise through the machine. This fabric may be provided in any desired width. The opposite longitudinal edges of the burlap may be folded over and stitched down as at 102 through the employment of any conventional mechanism suitable for the purpose. At 103 suitable fabric folding means is diagrammatically illustrated and at 104 stitching means is diagrammatically illustrated.

As the burlap enters the machine it passes between upper and lower complementary burlap pleating shoes which form a plurality of parallel longitudinally extending pleats in the burlap. The fabric is drawn forwardly through the machine by feed rolls 106 and 108. It passes over a guide roll 110 which guide roll is spaced between the pleating shoes and the feed rolls. The fabric is drawn forwardly in a succession of steps which steps alternate with pauses in the forward movement of the fabric. During the pauses in the advance of the burlap a reinforcing wire 112 is thrust transversely through the pleats formed in the fabric. Such wire is cut off and bent over a marginal fold of the burlap and clenched thereinto as hereinafter described.

It will be seen in Fig. 1 that a succession of wire sections 112 are arranged in spaced parallel relationship as a group. A second group of similarly spaced wires likewise indicated as 112 is shown spaced ahead of the first group a distance greater than the spacing between the individual wires in the group. This spacing of greater length provides a blank interval through which the fabric is severed by mechanism hereinafter described.

A reel of reinforcing wire is indicated in Fig. 1 at 114. Wire is withdrawn therefrom by wire feed mechanism indicated generally as W from this reel and advanced through the pleats in the burlap. This wire feed mechanism advances the wires in a step by step movement. The intermittent advance of the wire is coordinated with the intermittent advance of the burlap so that the wire is thrust through the pleats in the burlap during the pauses in the advance of the burlap and the burlap is drawn forwardly during the pauses in the advance of the wire and after the wire section thrust through the burlap has been cut off. There is a skip feed in the advance of the wire which provides the extra length intervals between successive groups of wires as shown in Fig. 1.

Positioned between the reel of wire 114 and the wire feed mechanism W there is disposed suitable wire straightening mechanism and wire holding and braking mechanism indicated generally in Fig. 1 as H.

In Fig. 2 the wire reel is omitted, but the wire 112 therefrom is shown at the top of the sheet as entering the wire straightening and holding mechanism H and the wire feed mechanism is generally there indicated as W. The wire is not shown as leaving the wire feed mechanism and entering the machine in Fig. 2, but that part of the machine which includes the burlap feed rolls and the pleating shoes is indicated in Fig. 2 generally by the letter B. The burlap severing mechanism or shears is indicated generally in Fig. 2 by the letter S and the timing mechanism which coordinates certain movements of the machine as hereinafter set forth is indicated by the letter T and is shown at the left of Fig. 2.

The various mechanisms referred to and which collectively make up the entire machine are shown in Fig. 2 as mounted upon a leg supported bed plate or table 116. An electric motor 118 is suspended below the table. This motor through driving means 120 drives a Reeves reduction drive device R through which Reeves device all of the mechanism of the machine is driven. The Reeves device drives a main shaft M upon which are mounted all of the various cams which actuate parts of the machine. This main shaft passes directly through the Reeves as shown particularly in Figs. 2 and 3. The main shaft M is shown in Figs. 2 and 3 as projecting beyond the end of the Reeves away from the machine and as having such end projection broken off. This was for the purpose of driving other mechanisms not shown in this application.

Fig. 3 is a back view and shows the Reeves device as provided with a driven sprocket 122 which drives a chain 124 which chain extends to a sprocket 126 of the wire feed mechanism W to drive the wire feed mechanism.

Wire feed mechanism

The wire feed mechanism W is supported upon the bed plate 116 adjacent to the Reeves device. The housing for the wire feed mechanism comprises a pair of spaced upright side frames 128. One of these upright frames is shown in elevation in Figs. 2 and 3. It is interiorly cut away as at 129 exposing operating mechanism supported between the two side frames. Mounted upon and superimposing the upright side frames 128 is a head casting 130. This head casting 130 supports the wire feed drive shaft 132. In Fig. 4 the shaft is shown as extending through the casting and journaled therein adjacent to its two ends as at 134. Cover plates 135 extend over the bearings. This drive shaft is a short shaft and projects at the rear beyond the head casting. Such projecting end is provided with a drive sprocket 136 fastened to the shaft. The drive chain 124 from the Reeves sprocket 122 extends about this sprocket 136 and drives the shaft 132.

A chain tightener adjustable to tighten the chain is shown in Figs. 3, 4 and 10. The chain tightener comprises a bracket provided with a base plate 138. This base plate is seated within a recess 140 in a side frame 128. It is secured within this recess to the side frame by screws or the like, as shown in Fig. 10. An arm 142 projects outwardly from the base 138 normally thereto and is provided at its outer end with a head portion 144. This head portion forms with the arm a part which is T-shaped in cross section. The bracket includes a reinforcing web member 145 which extends between the base and the head, as illustrated in Fig. 10.

A plate 146 is adjustably slidably seated upon this T-head 144, as shown in Figs. 3 and 10. This plate is recessed on its face which juxtaposes the T-head to seat thereover as shown in Fig. 10. Such plate is provided with a slot 148 which extends lengthwise of the plate. Fastening screws 150 are adjustably threaded in the head 144. These screws extend through the slot 148. They are provided with bead caps which overhang the margins of the slot and hold the sliding plate in adjusted positions to which it may be moved in tightening the chain.

The plate 146 is provided at its upper end with an inwardly projecting boss 152 which boss is fixed to the plate by welding or the like. A stub shaft 154 is carried by and projects inwardly of the boss toward the side frame 128. This stub shaft is secured to the boss by a set screw or the like (Fig. 10). A chain engaging sprocket 156 is rotatably journaled upon this stub shaft being held thereon by a head on the end of the shaft. It is apparent that by adjusting the sliding plate 146 upon the bracket head 144 the tension on the chain may be increased or decreased.

The wire feed drive shaft 132 has a gear 160 fixed thereon to rotate therewith. This gear, as shown in Fig. 4, is mounted within the head casting 130. The wire feed mechanism is driven by this gear 160. Such gear 160 meshes with and drives two gears 162 and 164 (Fig. 3) which gears are similar and similarly spaced upon opposite sides of the drive gear 160. These gears 162 and 164 are separately mounted upon separate shafts 166 which shafts are journaled in the opposite sides of the head casting upon bearings 167 closed by cover plates 169. One of these gears and its shaft is shown at the top of Fig. 6 (Sheet 4). Each gear has a wire feed roll 168 fixed thereto to rotate therewith. These two wire feed rolls are similar and they constitute the two upper wire feed rolls. These upper feed rolls are constantly driven because the two gears that carry them are always in mesh with and constantly driven by the gear 160. These two upper feed rolls with their gears constitute an upper wire feed roll assembly.

There is a lower wire feed roll assembly which includes two lower wire feed rolls 170 with their companion driving gears 180. One of these wire feed rolls and its gear is shown in Fig. 6. These two lower wire feed rolls are adapted to engage the two upper wire feed rolls to grip the wire therebetween.

Each lower wire feed roll is provided with a circumferential groove 172. Each upper wire feed roll is provided with a complementary circumferential rib 174. These ribs 174 of the two upper wire feed rolls fit within the grooves 172 of the two lower wire feed rolls. The wire 112 is held frictionally between the ribs and the bottoms of the grooves to be advanced upon rotation of the rolls.

Each lower wire feed roll 170 is fixed upon a hub 176 which hub is fixed upon a shaft 178. Each hub also carries a lower wire feed roll gear 180. Such gear 180 is in mesh with and is driven by its companion upper wire feed roll gear 164. The two upper wire feed roll gears are constantly driven by the gear 160 and the two lower wire feed roll gears in mesh with their companion upper wire feed roll gears. They are constantly in mesh with the two upper wire feed roll gears. Fig. 6 shows an upper wire feed roll 168 engaged with a lower wire feed roll 170 and the rib 174 of the upper roll holding the wire against the bottom of the groove 172 in the lower roll. While the upper and lower wire feed rolls are constantly driven, the feeding of the wire is intermittent due to the fact that the lower wire feed roll assembly is periodically swung downward so that the wire is released. The downward swing of the lower wire feed rolls is small, being insufficient to break the driving engagement of the upper and lower wire feed roll gears. It is sufficient, however, to release the wire so that it is no longer gripped between the rolls to be driven thereby.

The two lower wire feed rolls 170 and their gears 180 are shown in Fig. 8, Sheet 5. Each of the two shafts 178 upon which a lower wire feed roll and its gear is mounted is itself journaled at opposite ends within bearings 181 within a cradle frame 182. Cover plates 183 close the ends of the bearings over the ends of the shafts. This cradle 182 is pivotally supported upon the trunnions 184 between the two side plates of a swinging frame 186, as shown particularly in Fig. 8. This swinging frame 186 is pivotally supported at one end upon trunnions 188 carried by the wire feed mechanism upright frame members 128. (Note Figs. 3, 5 and 8.)

The normal position of the cradle 182 and the swinging frame 186 which carries the cradle is swung down away from the upper wire feed roll assembly. Such downward drop is insufficient to withdraw the lower wire feed roll gears 180 out of driving engagement with the upper wire feed roll gears 164 but is sufficient to move the lower wire feed rolls away from the upper wire feed rolls so that the wire is no longer gripped therebetween to be driven thereby. As the swinging frame and cradle drop down, the lower feed rolls withdraw away from the upper feed rolls and away from the wire so that the advance of the wire is interrupted. The lower wire feed rolls then rotate idly and the wire remains stationary.

The wobble or cradle swing of the cradle 182 upon its trunnions 184 on the swinging frame 186 is yieldingly limited by expansion coil springs 190, shown in Figs. 3 and 5. These springs encircle pins 192 carried by and extending upwardly from ears on the sides of the cradle through lugs 194 of the stationary frame. These springs extend between the ears and the lugs. When the swinging frame 186 drops these springs 190 act upon both ends of the cradle to maintain it upon an even keel so that both of the lower wire feed rolls will disengage the wire. These springs also serve to maintain the cradle on an even keel when it is raised thereby causing the two lower wire feed rolls to be brought into engagement with the wire and hold it up against the two upper wire feed rolls.

A stationary guide 196 for the wire is shown in Figs. 3 and 5. Such wire guide is disposed between the two pairs of upper and lower wire feed rolls and approximately directly above the pivotal support 184 of the cradle. This wire guide 196 is shown in Figs. 3 and 4 as in the form of an angular bracket fixed to the frame and provided with a wire guide passageway therethrough for the wire.

This lower wire feed roll assembly is adapted to be raised by cam operated mechanism. A wire feed control cam 198 is fixed on the main shaft M, Figs. 3 and 5, to rotate therewith. This main shaft M which extends through the Reeves device (Fig. 2) is continuously driven. This cam is also shown in Fig. 15, Sheet 12. Fig. 15 shows the main shaft cams. A roller 200 carried by the swinging frame assembly rides on the periphery of this wire feed control cam. Such roller rises and falls with the rotation of the cam to raise and lower the lower wire feed roll assembly into and out of it wire feeding engagement with the upper wire feed roll assembly.

This roller 200 is journaled directly on a stub shaft 202. This shaft is fixed to the outer end of an L-shaped arm 204, as shown in Fig. 5. Such arm 204 is pivoted at 206 to the outer end of a swinging subframe 208 which subframe is hinged at its opposite end upon a pivot 210. This pivot is carried by lugs 212 which lugs depend below the swinging frame 186. (Note Figs. 3, 4 and 5.) The shape of this subframe is shown in Fig. 9, Sheet 4. The subframe extends from its hinge pivot 210 underneath and spaced below the swinging frame, as shown particularly in Fig. 5.

The subframe 208 is provided with spring pads 212 projecting laterally from opposite sides (Figs. 3, 5 and 9). These two spring pads support two heavy springs 214. These springs in turn hold the free end of the swinging frame 186 upwardly (Fig. 5). The upper ends of these springs 214 seat within rests in the bottom of the swinging frame. The subframe is coupled with the swinging frame to prevent too great a separation therebetween by an upright connecting pin 216. Such pin is adjustably threaded into the subframe and extends upwardly therefrom freely through a provided aperture in the swinging frame, as shown in Fig. 5. The tension of the springs 214 is adjustable by means of adjustment screws 218 threaded through the spring pads 212' and provided with plates 220 which plates rest directly underneath the springs.

As shown in Fig. 9, the subframe has an apertured end 211 which is mounted upon the pivot 210. The opposite end of the subframe is provided with a pair of spaced apart apertured ears 209 which carry the pivot 206 upon which pivot the swinging arm 204 is mounted. The subframe is generally fork shaped and the two forks terminate in the ears 209. These fork portions are connected together by a web so that the subframe constitutes a strong integral structure. The spring pads 212 are extensions laterally of the connecting web. This web is also extended to provide a channel-shaped member 213 having a downwardly open channel 230. The L-shaped roller carrying arm 204 which is pivoted upon the pin 206 between the ears 209 of the subframe has a downwardly projecting portion 222 (Figs. 5 and 7). This portion 222 of the arm has permitted swinging clearance within a cut away opening 224 of the channel portion 213 of the subframe, as shown particularly in Fig. 9, and which is provided for a purpose hereinafter described.

A control bar 226 is pivotally supported at one end upon a pivot 228 within the channel 230 formed in the part 213 of the subframe, as shown in Figs. 7 and 9. This control bar is normally held upwardly at the position shown in solid line in Fig. 7 and as also shown in Figs. 3 and 5 by a long spiral spring 232 which spring encircles a rod 234, Fig. 3. Such rod has its upper end pivoted at 235 to the outer end of the control bar. The rod is coupled at its lower end with a solenoid plunger 236. The solenoid assembly which includes the plunger is indicated in Fig. 3 as 238. This solenoid forms a part of timing mechanism hereinafter described under such heading. At determined intervals the solenoid is energized to draw the plunger and the rod 234 down against the resistance of the spring 232 and to withdraw the control bar 226 to the position shown in dotted outline in Fig. 7.

When the rod is drawn downwardly so that the control bar 226 is swung to the position shown in dotted outline in Fig. 7, such bar is pulled out of the channel 230 and the lower end 222 of the L-shaped roller carrying arm 204 is free to swing within the cut away opening 224 in the subframe. When this occurs lifting of the roller 200 by cam 198 does not lift the subframe 208 and the swinging frame 186. The roller carrying arm at such times swings idly upon its pivot 206 and the lower end 222 of the arm swings freely within the cut away opening 224.

It will be understood that as the main shaft M rotates continuously during the running of the machine the cam 198 lifts the roller 200 once for each revolution of the shaft. When the control bar 226 occupies the solid line position shown in Figs. 5 and 7, lifting of the roller 200 lifts the subframe 208 and the swinging frame 186 and the cradle 182. At such time the roller carrying arm 204 cannot swing upon its pivot 206 because this is prevented by the presence of the control bar 226. Whenever the subframe and cradle are lifted, as described, the wire is gripped between the upper and lower wire feed rolls. As the wire feed rolls are continuously driven the wire is advanced as soon as it is gripped between the upper and lower sets of rolls. This advance continues only so long as the lower wire feed roll assembly is held upwardly, which is normally but a short arc of the main shaft M. The wire is fed forwardly rapidly when it is advanced.

During the pauses between the intermittent advances of the wire the wire is cut off, the ends are clenched over and the burlap is pulled forwardly to a new position to receive another wire. At those intervals when the timing mechanism operates to energize the solenoid and the rod 234 draws the free end of the control bar 226 down and the roller carrying arm 204 swings idly there occurs what might be termed a skip feed of the wire. It is this skip feed of the wire which produces the extra length intervals between the groups of wire previously mentioned in the discussion of Fig. 1 and shown in such figure.

It is desirable that the wire be as straight as possible and free from kinks when it enters the wire feed mechanism. For this purpose wire straightening mechanism is provided. Such wire straightening mechanism is shown in Figs. 13 and 14, Sheet 6. Such wire straightener is supported by a bracket or platform 240 mounted at one side of the wire feed mechanism and supported upon the two side frames 128 of the wire feed mechanism. Such wire straightener comprises one series of vertically disposed hardened rollers 242 between which the wire 112 is drawn by the wire feed rolls and a second series of horizontally disposed hardened rollers 244 arranged in line with the vertically disposed series of hardened rollers. Such wire straightener serves to straighten the wire in both the vertical and horizontal planes. From this straightening mechanism the wire passes between the wire feed rolls.

It is not only necessary that after the wire has been thrust through the fabric that its advance be stopped in order that it may be cut off and have the ends of the cut off section bent over, but it is also necessary that the advance of the wire from which the section has been cut off be abruptly halted. Such stoppage of the advance of the wire takes place by gripping the wire securely at a point between the wire carrying roll 114 and the wire straightening mechanism 240.

Upon the outer end of the wire straightener 240 there is mounted an opposed pair of wire gripping plungers carried by a housing 246. The upper plunger 248 is adjustably threadedly mounted within the housing. The housing is cut away providing an opening 250 and the wire gripping end of the plunger 248 is visible within this opening (Fig. 13). This upper plunger is stationary except that it has this permitted adjustment. A wire guide nose 252 is shown on the face of the housing 246 and through which the wire is guided to enter the housing between the plungers. There is a lower plunger 254 which is adapted to be raised to grip the wire between the lower plunger and the upper plunger or to be lowered to permit the advance of the wire.

This lower plunger 254 is adjustably mounted within a socket 256 carried by brake lever arm 262. This socket is provided with a pivot 258 which pivot is mounted within a slot 260 in the brake lever arm. The arm 262 is swingably supported at 264 upon the outer end of a brake lever 266. This lever 266 is fixed at 268 to the swinging frame 186 to swing with such frame. The outer end of this lever 266 has an upwardly offset rigid end section 270 provided with an oversize passageway 272 through which the socket part 256 extends and within which it is permitted to float, as shown in Fig. 16. The swinging brake lever arm 262 is held yieldingly upwardly toward the offset extension 270 of the brake lever 266 by a spring 274. Such spring is carried by a pin 276 which pin is threaded into the offset end extension 270 and passes slidably through an aperture in the arm 262, as shown in Fig. 13.

When the swinging frame 186 of the wire feed mechanism drops down, as heretofore described, and releases the wire from between the wire feed rolls the outer end of the brake lever arm 266 swings upwardly and the plunger 254 grips the wire 112 against the upper plunger 248 and the wire is held stationary. The wire is therefore automatically gripped and held between the upper and lower plungers at all times when the lower feed roll assembly is dropped down away from the upper wire feed roll assembly.

The wire passes from the wire feed mechanism W into the machine through a sleeve or guide channel member 280, as shown in Fig. 5. A bracket 282 is fixed to one side of the wire feed mechanism frame by screws or the like, shown in Fig. 11. This bracket is provided with a seat to removably support one end of the wire guide sleeve 280, the sleeve being held therein by a set screw 284, as shown in Fig. 11.

The opposite end of the wire guide sleeve 280 is supported upon the frame of the machine by a bracket 300 secured by screws or the like to the frame, as shown in Figs. 5 and 12. This bracket is cut away as at 302 and a set screw 304 is adapted to be threaded into this opening to hold the end of the sleeve therein. The sleeve may be readily removed from the bracket by releasing the set screws 284 and 304.

This wire guide sleeve is provided with an opening opening 286 which is the one free space between the wire feed mechanism W and the fabric feeding and pleating part of the machine B within which the wire can buckle. Should there be some failure on the part of the brake mechanism or the wire feed mechanism whereby the wire continued to feed after it was desired to stop the same and after its entrance into the burlap feeding and pleating part of the machine was blocked in some way, this opening 286 provides a space into which the wire could buckle upwardly.

A wire buckling safety switch device is provided to stop the machine upon buckling of the wire into this opening 186. This safety switch device has a plunger 288 which projects into the opening 286 and rests normally lightly on top of the wire, as shown in Fig. 11. The plunger is held down on the wire by a spring 294. The plunger is slidably supported within a guide 290 mounted upon an upwardly projecting backing plate 292 of a bracket 282. The upper end of the plunger is adapted to engage a roller 296 on the end of a safety switch lever 297. If the wire buckles it lifts the plunger and trips the safety switch. This switch is disposed in the control circuit for the machine and upon the tripping of the switch the circuit is broken and the machine is stopped.

*Wire cut off and end shaping mechanism*

Suitable fabric 100 such as burlap, is withdrawn from a roll of fabric and advanced through the machine, as herein described. During such advance this fabric is pleated lengthwise, as illustrated in Fig. 1, and the wire feed mechanism thrusts the reinforcing wire through the fabric during the pauses in its intermittent advance. That portion of the wire which has been thrust through the fabric is cut off and bent over selected parts of the fabric and clenched into the fabric. In the drawings, the fabric 100 is illustrated as having its margins folded over and stitched down to provide marginal folds or reinforcements 102 and the transverse reinforcing wires 112 are bent over these marginal folds 102 and clenched into the fabric. This is shown schematically in Fig. 1.

Figs. 17, 18, 19 and 20, Sheet 1, illustrate successive steps in the cutting off and bending of the cut off ends of the wire. In Fig. 17 the wire is shown as cut off at an angle to produce a sharpened point which can easily pierce its way through the fabric. In the first bending operation shown in Fig. 18 the extreme end of the wire is bent at an angle as at 306. In the second bending operation shown in Fig. 19 the wire is further bent as at 308. In the final bending and clenching step shown in Fig. 20 the bent up portion 308 is folded over the marginal fold 102 of the fabric and the extreme end 306 of the wire is thrust through the fabric.

After the wire has been thrust through the pleats in the fabric the section of the wire so thrust through is cut off. Such section is not only cut off, but the extreme end of the section which has been thrust entirely through the fabric is also cut off. Such cutting off of the outer end of the wire section is done in order that the length of the wire section shall be accurately established and both ends of the wire section shall be accurately and correspondingly shaped so that the bending of the wire about the marginal folds of the fabric will be accurately accomplished. Such marginal folds of the fabric may, if desired, be otherwise reinforced and might even be formed in the fabric spaced to extend parallel to its margins. Similar wire cut off and end shaping devices are therefore provided on both margins of the burlap, as illustrated schematically in Fig. 1 by the reference identification WC. The description given herein of the wire cut off and end shaping mechanism at one side of the machine applies equally to the corresponding mechanism at the opposite side of the machine.

This wire cut off and end shaping mechanism is mounted upon the end frame members of the machine B, Fig. 2. This machine B comprises fabric advancing and pleating means, fabric cut off means, and the wire cut off and end shaping means. In Fig. 2 this machine structure B is shown in front elevation in combination with other parts of the entire assembly. Fig. 21, Sheet 10, is a top plan view of the machine B. Fig. 22, Sheet 11, is a front elevation, partly broken away, about the pivotal support of the shears.

Fig. 23, Sheet 14, shows one end frame support 310 of the machine B which support is mounted upon the bed plate 116, Fig. 2. This end frame support is the one seen looking in the direction of the arrow 23 in Fig. 22. At such end the machine is provided with a single end frame member. At the opposite end of the machine there are provided two end frame members 312 and 314 shown in Fig. 24, Sheet 14. This Fig. 24 is taken looking in the direction of arrow 24 in Fig. 22.

The wire feed cut off and end shaping devices are operated by means driven from the main shaft M. This shaft M is journaled in the end frame member 310 and in the end frame member 314, as shown in Figs. 23, 24 and 15. Superimposing the end frame member 310 is a head casting 316. Superimposing the end frame member 314 is a similar head casting 316. These head castings support and generally carry the wire cut off and end shaping devices. They are fixed upon the end frame members by stub bolts or the like as shown in Figs. 25 and 26.

Correspondingly similar reciprocable plungers and reciprocable dies which cooperate to cut off and shape the ends of the wire sections are mounted within these head castings 316. In Fig. 25, Sheet 9, the wire cut off and end shaping plunger 318 is shown as supported for upward angular slidable reciprocation within a guideway provided in the head casting which guideway is provided with a liner bearing 320 for the plunger. This plunger is provided at its lower end with a roller 322. This roller is disposed for travel within a cam guideway 324 formed on the side of the wire cut off cam 326, which cam is fixed to the main shaft M to rotate therewith. The main shaft M is provided with two of these cams, one adjacent to each end frame member as shown in Fig. 15. The cam guideway 324 is on the face of the cam adjacent to the end frame member as shown in Fig. 25, Sheet 9.

In Fig. 27, Sheet 13, which is taken on the section line 27—27 of Fig. 25, the cut off plunger is shown in a half way elevated position for cutting off the wire. It cuts off the wire at an angle as shown. The upper end and back side of the plunger, as at 328, Fig. 28, Sheet 5, cuts off the wire as it travels across the beveled face of the wire guide sleeve 281, Figs. 27 and 28, which wire guide 281 within the head casting forms a continuation of the wire guide 280 as shown in Figs. 15 and 25.

As the plunger 318 continues on its upward travel it bends the cut off end of the wire as at 306 upwardly. This is shown in Fig. 28. There are two reciprocable slidable die members identified as #1 die 332 and #2 die 334. The mounting and functioning of these dies is hereinafter described. They are both shown projected forwardly in Fig. 28 and the end of the wire is there shown bent upwardly as at 306 over a face of the #1 die.

Following the bending of the end of the wire as at 306 upwardly over the #1 die, as shown in Fig. 28, this #1 die is withdrawn rearwardly and the continued upward movement of the plunger 318 bends the wire over the face of the #2 die 334 as shown in Fig. 29, Sheet 11. The forward edge of the plunger acts upon the wire to accomplish these bending operations, as shown particularly in Figs. 28 and 29. The #2 die 334 is then withdrawn and the plunger 318 is withdrawn downwardly preparatory to the folding of the wire over the margin of the fabric and the clenching of the wire thereinto.

The dies 332 and 334 over which the wire is shaped are mounted within a provided guideway in the head casting 316. This guideway extends perpendicularly with respect to the passage of the wire through the head casting. Such dies are shown in Figs. 31, 32 and 33. The two dies are mounted side by side within the provided guideway for reciprocable movement back and forth. The two dies are tongue and grooved together for independent as well as joint slidable movement, as shown in Fig. 32. The #1 die is coupled to the #2 die by a pin 336 carried by the #1 die and such pin projects into a slot 338 formed in the adjacent side of the #2 die, as shown in Fig. 31.

When the #1 die is shoved forwardly the #2 die is carried along with it, as would appear from Fig. 31, by the pin engaging the end of the slot 338. When the #1 die is withdrawn it is drawn back along a permitted distance leaving the #2 die projected forwardly. It is at this projected position of the #2 die after the #1 die has been withdrawn that the wire is bent over the #2 die as shown in Fig. 29. Continued rearward withdrawal of the #1 die now also draws the #2 die rearwardly so that both dies are withdrawn and clear the way for the wire clenching plunger which then comes in from the side, as shown in Figs. 25 and 30 and hereinafter described. The provided way for the slidable dies is formed in the one edge of the head casting 316 and such way is closed by a cover plate 340 which may be held in place by screws or the like as shown in Fig. 26.

Fig. 26 shows the mechanism provided for actuating the dies in coordination with the movement of the wire cut off and wire shaping plunger 318. As shown in Figs. 15 and 25, the cam member 326 on the outer face of which is provided the cam groove 324 within which travels the roller 322 that actuates the wire cut off plunger is provided on its periphery with a circumferential cam face 342 upon which rides a roller 344 (Fig. 26). This roller is supported on the forwardly projecting end of an L-shaped lever 346 which lever is pivoted as at 348 between a pair of spaced lugs of a bracket 350 which bracket is fixed to the end frame member 314 by screws or the like, as shown in Fig. 26. The upwardly projecting leg of this lever 346 is shaped as shown in Fig. 15 having a pair of spaced apart ribs 347 connected by a web. A spring 352 is carried by a stud 354 (Fig. 26) and this stud extends through an oversize opening in the web of the lever 346. This stud is itself mounted upon the bracket 350. A spring 352 bears at one end against the head of stud 354 and at the other end against the web of the lever to swing the lever to hold the roller against the cam face 342.

The upper end of this upwardly projecting leg 347 of the L-shaped lever 346 is coupled with the die 332, as shown in Figs. 15, 26 and 31. Die 332 has a rearward extension 356 which extension is provided with a vertical guideway 357 formed therein as shown in Fig. 26. A block 358 is mounted upon the upper end of the leg 347 of the L-shaped lever. Block 358 is slidably disposed within this guideway 357 in die 332 so that as the L-shaped lever is reciprocated the block is permitted to travel within this guideway as it reciprocates die 332.

The die 334 is held normally yieldingly forwardly by a spring 360 which is mounted upon a pin 362 which pin is secured to and projects rearwardly from the head casting 316 as shown in Fig. 33. The inner end of this spring bears against a spring pad bracket 364 which bracket is secured by screws or the like to die 334 as shown in Figs. 15 and 33. This spring serves to normally urge the die 334 to the forwardly projected position shown in Fig. 31. The bracket 364 carries a stop 365 adapted to abut the head casting 316, as shown in Fig. 33, to determine the forward projected position of the die 334. When the die 332 is withdrawn following the first bending of the wire die 334 is held forwardly by the spring 360 until the pin 336 carried by the die 332 comes to the rear end of the slot 338 and picks up die 334 and draws it rearwardly against the tension of the spring 360.

In addition to the cam surface 324 on the outer face of the cam member 326 and the cam surface 342 on the periphery thereof, both of which have been described, there is a third cam surface on cam member 326 which third cam surface is on the side shown in elevation in Fig. 26. Such cam surface controls mechanism which functions to hold the cut off section of wire which has been thrust through the burlap during the shaping of the ends of the wire and this mechanism is hereinafter described.

To accomplish the final clenching of the wire which has been bent upwardly, there is provided mechanism which responds to another cam mounted on the main shaft. Such main shaft has fixed thereto adjacent to the outside of the end frame members 310 and 314, as shown in Fig. 15, Sheet 12, a pair of cam members which control the functioning of this wire clenching mechanism in coordination with the functioning of the wire cut off and end shaping mechanism. Adjacent to and outside of end frame member 310 a cam member 368 is fixed on the main shaft M.

Adjacent to and outside of end frame member 314 is the wire cut off cam 198 which cam is provided with a second cam face for the same purpose. The periphery of each of these cam members 198 and 368 is provided with a cam groove 370 which has its cam face extending axially as shown in Figs. 15 and 25. A roller 372 mounted on the end of a swinging lever 374 travels in this cam groove. The lever is pivoted at 376 upon a bracket 378 which bracket is secured to the end frame members 310 or 314 as the case may be, as shown in Figs. 15 and 25.

The upper end of this lever is coupled by means of a link 380 with a mounting bracket 382, which mounting bracket carries the wire clenching plunger 384 as shown particularly in Fig. 25. This plunger is mounted within a forwardly angularly extending guideway formed in the head casting 316 which guideway is lined with the bushing 386. This is the plunger shown also in Fig. 30. This plunger is adapted to be reciprocably projected to clench over the end of the wire, as shown in Fig. 30. The end of the plunger is shaped to engage that portion of the wire indicated at 308 in Fig. 19 and fold the same over the marginal fold 102 of the fabric and then continue over the wire, as shown in Fig. 30, clenching it through the fabric.

In order to be sure that the wire is clenched completely over the marginal folds of the fabric such marginal folds are grasped and held outwardly stretching the fabric transversely at the time of the wire clenching operation. This is accomplished by mechanism which is actuated concurrently with the wire clenching operation. Each head casting 316 has a bracket 388 secured to its front face as shown in Figs. 25 and 34. This bracket is provided with a pair of lugs 390 and a lever 392 is pivoted between these lugs as shown in Fig. 34. This lever is coupled by a rod 394 and spring mechanism surrounding the rod with a part 396 which part is carried by the mounting bracket 382 that carries the plunger 384 (Fig. 25). A spring 398 encircles the rod between the part 396 and the end of the rod pivoted to the lever 392 so that whenever the mounting bracket is actuated to push the plunger 384 downwardly the spring is urged by the part 396 to swing the lever.

The lever at its lower end is provided with a foot portion 398 adapted to engage underneath the marginal fold of the fabric, as shown in Fig. 34, to exert a pull on the fabric to stretch the same transversely of the machine as the upper end of the lever is swung inwardly by the spring. This foot portion is provided with a part 399 pivotally supported thereon at 401, which part is shaped to ride up over the burlap fold 102 as shown in Fig. 52, Sheet 5. It will be seen that the bracket 388 has a plate part 400 which extends underneath the fabric inwardly and supports the fabric, as shown in Fig. 34. The coordination of the movement of the foot 398 as it stretches the fabric with the plunger 384 which clenches over the wire is such that the fabric is stretched outwardly so that when the wire is clenched over it is clenched accurately about the marginal fold, as shown in Fig. 30, Sheet 11. 399' (Fig. 25) indicates a stop carried by the lever which determines the outward swing of the lever as it stretches the fabric.

*Fabric feed mechanism*

A strip of burlap 100 is drawn forwardly step by step from the supply roll 101 by the fabric feed rolls 106 and 108. The large roll 106 is mounted on the shaft N. This shaft N extends parallel to the main shaft M and is disposed forwardly thereof. It is supported within the end frame members 310 and 312 as shown in Figs. 21, 22 and 23. It extends at both ends beyond these frame members. It is driven in a step by step manner. This large feed roll shaft is provided outside of the end casting 310 with a large gear 404 which gear is fixed on the shaft as shown in Figs. 2 and 23, Sheets 2 and 14, respectively. The opposite end of this shaft is journaled at its extremity within a bracket 405 (Fig. 2) mounted on the end of the timing gear casting hereinafter described. That portion of the shaft extending between the end frame member 312 and the bracket 405 carries one way clutch mechanism which responds to the rotation of a cam on the main shaft M to rotate the shaft N in a step by step manner.

This large gear 404 meshes with a small gear 406 mounted on the projecting end of a shaft 408 which shaft carries the small feed roll 108. The small feed roll 108 is held under spring tension toward the large feed roll 106. The opposite ends of the shaft 408, which shaft carries the small feed roll, are journaled within bearing blocks 410 (Fig. 24, Sheet 14). These bearing blocks are slidably mounted within guideways 412 which guideways are formed in the end castings 310 and 312 providing permitted adjustable movement of the small roll 406 toward and away from the large roll 404. A pin 414 is threaded into each bearing block 410. This pin projects outwardly from the block and slidably through a stud 416, as shown particularly in Fig. 24, Sheet 14. This stud is threaded into a cap casting 418, which cap casting is secured to the end frame member 310 or 312, as the case may be. The pin 414 has a nut 420 threaded thereon which nut bears against the end of the stud 416.

An expansion spring 422 encircles the pin 414 bearing at one end against the slidable block 410 and at its opposite end against the stud 416. These springs exert a tension on the blocks which mount the small feed roll. The small feed roll is therefore yieldingly held toward the large feed roll within the range of its permitted movement. Adjustment of the nuts 420 on the pins 414 determines the limit of movement of the small roll toward the large roll and therefore determines the minimum clearance between the two rolls. The springs permit the small roll to yield outwardly away from the large feed roll to permit fabric strips of varying thickness to pass between the rolls. The burlap web which carries cross wires and its margins are folded over varying in thickness from place to place. Actually this permitted adjustment of the small roll with respect to the large roll is very small because it necessarily has to be within the driving engagement of the teeth of the gears 404 and 406.

The fabric guide roll 110 is disposed above the fabric feed rolls 106 and 108, as shown in Figs. 1 and 2 and also in Figs. 23 and 24, Sheet 14. This guide roll is provided adjacent to its opposite ends with circumferential fabric guide bands 422 shown particularly in Fig. 22, Sheet 11. These bands are adapted to engage the longitudinal margins of the fabric web to serve as guides therefor. These bands 422 are adjustable axially of the roll to suit fabric strips of different width. Fig. 22 shows one band as provided with set screws.

This guide roll 110 is adjustable fore and aft of the machine for the purpose shown in Fig. 35, Sheet 13, and as also illustrated in Fig. 1. This adjustment is for the purpose of being able to set the particular point at which the fabric will be severed by the shears, as hereinafter described, by varying the length of the run of the fabric between the fabric feed rolls 106 and 108 and the point at which the reinforcing wires 112 are inserted through the fabric.

This guide roll is shown as mounted upon a shaft 426 (Fig. 22, Sheet 11). Fixed to opposite ends of the shaft are pinions 428. These pinions are rotatably supported upon stationary rack bars 430. These rack bars are fixed upon the end frame members 310 and 312, as shown in Fig. 21, Sheet 10, and Fig. 22, Sheet 11. The pinions 428 are supported upon the rack bars 430 for travel fore and aft thereover. The ends of the shaft project beyond the pinions and are journaled within brackets 432. These brackets are secured by stud bolts or the like 434 to the end frame members, as shown in Figs. 23 and 24, Sheet 14. These brackets are slotted as at 436 and the end frame members are provided with a line of spaced apart apertures 438 arranged below the rack bars 430 whereby the brackets have a substantial range of adjustment fore and aft of the machine to vary the position of the guide roll 110, as shown in Fig. 35.

As heretofore set forth, the fabric is fed forward step by step. This step by step advance of the fabric is provided for by mechanism responsive to the rotation of a cam on the main shaft. This cam on the main shaft is so arranged and mounted with respect to other cams on the main shaft which control the functioning of other parts of the machine that the burlap is advanced in proper timed sequence with the performance of other operations. The main shaft cam which actuates the mechanism to advance the burlap is shown in Fig. 2 and indicated as 440. This cam is shown cut away in Fig. 36, Sheet 8, which shows most clearly this step by step advance mechanism.

This cam 440 acts upon a roller 442 to swing a lever 444. The roller is mounted at the upper end of the lever. The lever is pivoted at its lower end at 446 to a bracket mounted on the bed plate 116 of the machine. This lever is coupled by a link 448 with an arm 450 of one way clutch mechanism mounted on the end of the shaft N which shaft carries the large burlap feed roll 106. The only function of the shaft N is to carry this large feed roll.

The clutch mechanism itself is a spring-pressed roller one-way clutch device of a generally conventional character. The outer part 452 of the clutch carries two arms 450 and 454. The arm 454 of the clutch is held by a tension spring 456, shown in Fig. 36 as connected with the bed plate, to tend to rotate this outer part 452 of the clutch in a counterclockwise direction. The inner part 450 of the clutch is fixed to the shaft N. The outer part 450 is rotatably supported upon the inner part and upon the shaft N as shown in Fig. 37. Clutch rollers 460 held by springs 462 are disposed within cut away openings 464 in the inner part of the clutch. Upon rotation of the outer part 452 (Fig. 36) of the clutch in a clockwise direction by swinging of the lever these rollers grip the inner part of the clutch and the large feed roll 106 is rotated clockwise through an arc to advance the burlap one step. This advance of the burlap occurs once for each revolution of the main shaft M.

To vary the length of the step so as to vary the spacing of the wires through the fabric the lever 444 is provided with adjustment means. There is a stud 466 which stud in rotatably threaded within the lever. One end of the link 448 is adjustably threaded upon this stud so that the link may be adjusted lengthwise over the stud thereby varying the length of the arc of rotation of the feed roll 106.

Fabric fluting mechanism

As the fabric is drawn through the machine it passes between upper and lower bridge members and between cooperating upper and lower fluting shoes carried by such bridge members so that the fabric is fluted, as shown. The lower bridge member is indicated as 470. It extends between and is supported upon inwardly projecting end portions of the head casting 316, as shown in Fig. 15, Sheet 12; Fig. 26, Sheet 7; and Fig. 38, Sheet 15. This lower bridge member is secured to these head castings by stud bolts 471 or the like, as shown in Fig. 26. The numeral 472, Fig. 15, indicates a reinforcing rib on the bottom of this lower bridge member. This bridge member 470 is provided with upwardly projecting pleating shoes 474 secured thereto in spaced relationship lengthwise of the member. Each shoe is provided with a slot 476 in its forward edge, which slot is adopted to receive the wire 112, as shown in Fig. 38.

The upper bridge member 480 is supported at its opposite ends upon the tops of the head castings 316 and extends across therebetween, as shown in Fig. 21, Sheet 10. It superimposes in spaced relationship the lower bridge member 470. This upper bridge member carries a series of depending upper fluting shoes 482. These shoes are supported by brackets 484 to depend below the bridge 480 (Fig. 38, Sheet 15). These brackets are secured to the bridge by adjustable bolt and nut means 486. These upper fluting shoes 482 are positioned in spaced apart alignment lengthwise along the upper bridge member to be received in the intervals between the lower pleating shoes, as shown particularly in Fig. 15.

Each upper pleating shoe 482 is provided with a hardened wire receiving insert 488 secured within the forward edge of the shoe, as shown in Fig. 38. Such insert block is slotted as at 490 to receive the wire therethrough.

Wire holding mechanism

A wire retaining device in the form of an angular lever 492 is pivoted at 494 at one side of each bracket 484 as shown in Figs. 38 and 39. This lever is held by a light spring 496 so that the foot 500 of the lever holds the wire 112 within the groove 490 in the upper pleating shoe. This spring 496 is mounted upon an adjustment screw 498 whereby its tension may be adjusted. Such lever will readily yield against the tension of the spring 496 so as to permit the fabric to be pulled forwardly in its step by step advance.

There is a swingable wire holding plate which extends along its front of the lower fluting shoe supporting bridge 470 and which is adapted to be swung to hold the wire positively in the slots 476 formed in the ends of the lower fluting shoes 474. This swingable plate comprises an intermediate portion 502 and two short end portions 504, Fig. 38. The intermediate portion is pivotally supported by arms 506 which are secured thereto adjacent the opposite ends thereof. These arms are pivoted at 508 to lugs underneath the bridge 470, as shown in Fig. 38. This plate is provided with wire engaging lip portions 510 which serve to hold the wire within the grooves 476 in the lower fluting shoes as shown in Fig. 38.

The intermediate portion of the plate is actuated from the two end portions thereof. These end portions are cam actuated. The operation of these two end portions is shown particularly in Figs. 26; 40, Sheet 7; and 38, Sheet 15. Each end portion is swung by cam actuated compound lever mechanism. The cams are carried by the main shaft M. One of these lever devices is shown particularly in Fig. 38. The two lever devices are similar. Each compound lever device comprises an upper lever part 512 which carries the end plate portion 504. This is a relatively short plate portion and is secured to the lever part by screws or the like, as shown in Figs. 38 and 40. This lever part is pivoted at 514 to a block 516 shown in Figs. 40 and 41, Sheet 7. This block is secured by screws or the like to the head casting 316. The short plate portion 504 carried by this upper lever part has a projecting lip portion 505 (Fig. 38) adapted to be received within the wire holding recess formed underneath a plate 507 which plate is secured to the end casting extension 505 of the lower bridge member, as illustrated particularly in Fig. 38.

The lower lever part 518 is pivoted at its upper end as at 520 to the underside of the upper lever part 512, as shown in Figs. 26 and 38. The lower lever part is also yieldingly coupled to the upper lever part by a nut and bolt arrangement 522 with an intervening spring 524 disposed between such lever parts. The tension of this spring may be adjusted, as is apparent. The lower lever part is provided with an arm 526 which carries a cam roller 528. This cam roller seats within a cam groove 530 formed on the inner face of the cam 326. This cam 326 is fixed on the main shaft. It has been described hereinabove for such cam is also provided with the cam faces 324 and 342 and the cam operating mechanism associated with these cam faces have heretofore been described. This is the same cam member that controls the wire cut off mechanism and the dies over which the wire is bent.

The construction is such that following the swinging of the wire holding plate downwardly and outwardly so as to permit the burlap to be drawn a step forwardly and following the pulling of the burlap forwardly to a new position the wire holding plate is swung up to a partially closed position at which point the wire is thrust through the burlap. The wire holding plate is then swung to a completely closed position as shown in Figs. 26 and 38. In this position it grips the wire.

During the time the cam roller 528 travels through that portion of the arc of the cam groove 530 which extends for approximately 90° in a clockwise direction in Fig. 26 away from the point indicated by the roller 528, the wire holding plate is held partially closed. It is spaced such a distance away from the bottom of the groove within which the wire is adapted to be seated that the wire can be readily thrust through the machine. During the remaining 180° of arc of the cam groove 530 the wire holding plate is swung to the open position. Through that arc of the cam groove 530 which extends in a counterclockwise direction for approximately 90° in Fig. 26 from the point in which the cam roller 528 is disposed, the wire is held firmly by the wire holding plate. During this time the wire is cut off and the ends are bent over.

The intermediate portion of the wire holding plate 502 is yieldingly connected with the two end portions 504 to swing therewith. Each end portion is cam operated as has been described. Each end portion has a stud or bolt 532 secured to one side of the upper lever part 512 and upon which is mounted one end of a pin 534. This pin extends through a branch 536 of the arm 506 which arm swingably supports the intermediate portion 502 of the wire holding plate. A spring 538 encircles this pin and is held under tension between the branch arm 536 and adjustment nuts 540. Other adjustment nuts 542 are provided on the opposite side of the branch arm 536 whereby the spring tension with which the intermediate portion of the wire holding plate is held against the wire may be adjusted, as desired.

Fabric severing mechanism

The web of fabric shown in Fig. 1 is cut up into sections of the length desired for use. The machine is so set up that these sections may be cut to the desired length and fabricated to contain the desired number of cross wires properly spaced apart. The web is severed at those intervals of increased or double width between the successive groups of wires. This cut off mechanism functions automatically during certain selected pauses in the step by step advance of the fabric. The cut off means proper is in the form of a large pair of shears S, Fig. 1. These shears consist of a stationary blade assembly and a swingable blade assembly. The stationary blade assembly comprises an angular bridge or support member 546 which is secured at opposite ends to the opposed frame members 310 and 312 by screws or the like as shown in Figs. 23, 24 and 42, Sheet 14. This angular support member is provided with a cutter edge bar 550, Fig. 35, Sheet 13.

The movable blade assembly comprises an angular support member 552 shown in Fig. 22, Sheet 11, as provided with a wide stiffening web. This blade member is provided with a cutter edge bar 554 (Fig. 35). This movable blade member is the lower blade member. It is also disposed rearwardly of the web. The stationary blade member is disposed forwardly of the web. This swingable blade member is journaled by means of bearings 556 upon a fixed supporting pivot or stub shaft 558, shown particularly in Fig. 22. These pins extend slidably through within a web reinforcement 560 of the end casting 312, Figs. 22 and 24. The shaft is held in place in this casting, as shown in Fig. 22, by set screws or the like. This stub shaft is further supported at its lower end. The lower end of the shaft extends through an opening in a block 562, which block is mounted upon the bed plate 116 of the machine.

The movable blade is held upwardly on the shaft 558 by means of a coil spring 564. This coil spring encircles a reduced end extension 566 of the shaft and bears at one end against adjustable nuts 568 and at its opposite end against a plate 570. This plate carries a plurality of thrust pins 572, two of which pins are shown in Fig. 22. These pins extend slidably through the bed plate 116 and the block 562 and bear against a hardened ring 574 secured to the lower end of that portion of the blade mounted upon the bearings so as to exert an upward thrust on the blade. This upward spring thrust on the blade holds the movable blade constantly in contact with the stationary blade at the point of cutting. This movable blade is tilted somewhat as is common in shear construction to provide the proper shearing action.

The movable blade is actuated by a cam mounted on the main shaft M. This cam is indicated in Fig. 2 as 576. It is shown also in Fig. 43, Sheet 8 which is an end elevation of the cam operated linkage which swings the movable blade of the shears. That end of the movable blade which is journaled upon the shaft 588 is provided with a short arm 578 which projects in the opposite direction from the movable blade 552. This short arm carries at its end a bearing portion 580, which bearing portion is shown as coupled by a pin 582 with cam operated linkage which actuates the movable blade.

There is a lever 584 swingably supported from the bed plate of the machine by means of a bracket 585 and a pivot pin 586. The upper end of this lever is provided with a cam roller 588 which bears against the periphery of the cam 576. For each rotation of the cam the lever is swung. The lever is held by a spring 590 (Fig. 43) so that the cam roller 588 bears at all times against the periphery of the cam. This spring 590 is connected at one end to the lever 584 and at the opposite end with bracket 592 mounted on the bed plate 116.

The connection of this lever with the movable blade 552 of the shears is an interrupted linkage. It is such as is shown in Fig. 43, Sheet 8, and Figs. 44 and 45, Sheet 13. The end portion of the linkage which is coupled with the lever is in the form of a link 594 pivoted at 596 to the lever. This link 594 has a plunger portion 598 at its outer end which extends through the adjacent end of a yoke member 600. The opposite end of this yoke is pivoted to the short arm 580 of the movable blade of the shears as at 582. This connection between the cam actuated swinging lever 584 and the movable blade of the shears is so interrupted that while that portion thereof, the link 594, which is coupled directly with the swingable lever is actuated each time the lever is swung, the opposite end portion of the linkage, the yoke 600, which is connected with the movable blade of the shears, is actuated only at such predetermined times as it is coupled with the link 594.

The plunger end portion 598 of the link 594 is provided at its outer end and between the two arms of the yoke 600 with a head or shoulder portion 602 (Fig. 43). This plunger part 598 is of sufficient length to permit slidable reciprocation through the arm of the yoke without the head part 602 picking up the yoke to actuate the same therefore permitting idle movement of the plunger relative to the yoke.

Timing mechanism operates through control means to interpose a part between the head 602 of the plunger and one arm of the yoke to couple the plunger and the yoke together for movement as a unit. This coupling action is so controlled by the timing mechanism that it comes into action during certain selected pauses in the advance of the fabric so that the shears are actuated to sever the fabric at selected points, as heretofore stated. The timing mechanism acts through a solenoid, the plunger of which is indicated as 604 in Fig. 43. This plunger is pivoted at one end to a lever 605 which lever is swingably pivoted at 606 upon a bracket mounted upon the bed plate of the machine. The opposite end of this lever is provided with upturned end portions 608. A roller 610 is carried by these upturned ends 608 of the lever 604. These ends 608 straddle a slotted plate 612 and the roller extends through the slot in the plate, as shown in Fig. 43.

This plate is provided with a pair of fork members 614 secured to opposite sides of the plate. These forks project upwardly therefrom, as shown in Figs. 43 and 45. These fork members slidably straddle opposite sides of the yoke 600 and opposite sides of the plunger part 598 which reciprocates within the yoke. They are receivable between the head 602 of this plunger part and one arm of the yoke 600, as shown in Fig. 43. When so received they couple the movable blade of the shears through the yoke 600 and plunger part 598 and link portion 594 with the swinging lever 584 to move with the lever. A pin 616 carried by the yoke 600 projects at opposite ends through slots 618 in the two fork members 614, as shown in Fig. 43. Two springs 623 are shown in Fig. 43 as resting on top of the sliding plate 612 and as received within pockets formed in the yoke 600. They serve to exert downward spring pressure on the plate 612 and through the plate upon the end 608 of the swinging lever 604.

The solenoid, the plunger of which is shown in Fig. 43 and indicated as 604, is cut into the electric circuit by timing mechanism. Energization of the solenoid pulls the solenoid plunger 604 down and lifts the forks 614 up and couples the yoke 600 with the link 594 to actuate the movable blade of the shears.

A spring 620 encircles a pin 622 which pin is pivoted at one end to the short arm 578 of the movable blade of the shears and extends slidably through an apertured lug 624 mounted on the bracket 592 as shown in Fig. 44. This is an expansion spring and it tends to hold the movable blade of the shears separated from the stationary blade so that the web of fabric can normally pass between these two separated blades of the shears.

Timing mechanism

Generally speaking, the timing mechanism controls the functioning of two solenoid assemblies. One solenoid assembly functions to set in movement means which brings the burlap cut off shears into operation. It does this by completing the linkage between the swinging lever 584 and the movable blade 552 of the shears operating linkage as heretofore described. The other solenoid assembly controls the functioning of the wire feed mechanism in that at intervals the wire feed is interrupted for longer periods of time than is usual. This is termed a "skip feed" mechanism.

In the feeding of the wire through the fabric the wire is fed step by step with pauses between the steps and the operation of the entire mechanism is such that at the pause intervals in the advance of the burlap the wire is fed therethrough and at the pause intervals in the feeding of the wire the wire is cut off and bent over and the burlap is advanced. When the required number of wires have been fed through the fabric to provide the number of wires desired for any desired length of strip, the wire feed mechanism is caused to pause or "skip a feed" and the fabric is advanced a step without any wire having been fed therethrough. This provides fabric intervals between the groups of wires of greater width than the fabric intervals that separate the successive wires in the group, all as indicated in Fig. 1.

It is through this extra length intervals of fabric that the shears move to sever the fabric into sections or strips. The timing mechanism controls the functioning of the solenoid assemblies which in turn control the functioning of the wire feed mechanism so as to skip a feed and the functioning of the shears so that the shears cut through this extra length interval of burlap in sequence with the other operations performed by the machine.

The timing mechanism is controlled by the rotation of a cam 626 mounted on the end of the main shaft M furthest to the left, as shown in Fig. 2. This timing mechanism is shown particularly in Figs. 46 and 51, Sheet 9; 47 and 48, Sheet 16; and 49 and 50, Sheet 7. The cam 626 is mounted on the shaft M adjacent to a hub 628 to which it is fixed to rotate therewith, as shown in Fig. 49. The adjacent end of the shaft is journaled in an upright web 630 of the timing mechanism supporting base 632 which base 632 is fixed to the bed plate of the machine, as shown in Figs. 46 and 47. This web 630 supports most of the timing mechanism. The shaft N previously described in connection with the description of the fabric feed mechanism also has a bearing in a bracket 405 which is carried by this web 630, as shown in Fig. 47.

This cam 626 acts upon a roller 634 which roller is mounted upon the upper end of a lever 636. This lever is swingably pivoted at its lower end upon a pivot 638 which pivot is carried by the web 630, as shown in Fig. 47. The lever roller 634 is held against the periphery of the cam by a compression spring actuated plunger device, shown in Figs. 46 and 47. The plunger is indicated as 640 and the spring as 642. The plunger acts against the lower end of the lever, as illustrated in Fig. 47. It is apparent that the lever is swung back and forth upon rotation of the cam once for each revolution of the shaft M.

This lever carries a ratchet dog 644. This dog is pivoted to the lever as at 645, Fig. 46. A spring 646 is mounted on the lever arm and exerts a tension on the dog holding it downwardly against a ratchet wheel 648. For each revolution of the cam 626, the dog 644 rotates the ratchet wheel 648 a definite arc. In the construction shown the ratchet wheel is adapted to be advanced two teeth for each revolution of the cam. On the backward swinging of the lever, the dog is withdrawn to pick up successive teeth of the ratchet wheel.

The ratchet wheel is held at each advanced position against backward rotation by a safety dog 650, Figs. 46 and 47. This safety dog is pivoted to the web 630 as at 651, Fig. 46. This safety dog is disposed below the ratchet wheel and is held upwardly against it by a spring 652. There is a bumper part 654 provided with an adjustment screw 655, shown in Figs. 46 and 47, which bumper is mounted on the web 630 above the ratchet dog 644 to prevent such dog 644 from bouncing upwardly and releasing the ratchet wheel.

This ratchet wheel 648 is fixed on the hub of a driving gear 656 (Fig. 51) to rotate therewith and the driving gear and the ratchet wheel are journaled upon a stub shaft 658 and seat against a shoulder of such shaft. This shaft is fixed in the web 630 of the timing mechanism support, as shown in Fig. 51. This driving gear meshes with and drives an idler gear 660. This idler gear 660 is journaled on a stub shaft 662. This stub shaft is carried by a lever arm 664. This arm is journaled at its lower end upon the stub shaft 658 alongside of the gear 656, all as shown in Fig. 50, Sheet 7. This idler gear is mounted upon an intermediate portion of this lever arm 664.

This lever arm is adapted to be swingably adjusted about its pivotal support on the shaft 658 and the upper end of the arm is adapted to be adjustably secured to the web 630, as shown in Figs. 46 and 47. A stud bolt 666 extends through a slot 668 in the lever arm and into any one of a series of apertures 670 formed in a plate plate 672, which plate is secured to the web 630. This adjustment of the lever arm is for the purpose of permitting the substitution of different sized driven gears in the train of gears in the timing mechanism to vary the timing sequence.

The idler gear meshes with and drives a driven gear 673, which driven gear is mounted upon another stub shaft 674, Fig. 49, Sheet 7. The opposite end of the stub shaft from that on which the gear is mounted carries toothed timing plates. This driven gear 672 is fixed upon a stud 676 and this stud 676 extends into and is keyed into the adjacent end of the stub shaft 674, as shown in Fig. 49, so that the gear 672 and shaft 674 rotate as one. This shaft 674 extends through and is journaled in a hub part formed in the web 630.

That end of the shaft which projects beyond the opposite side of the web 630 is tapered as at 678. A hub 680 is seated upon this tapered end of the shaft and drawn down tight thereon by a nut and washer arrangement on the threaded end of the shaft, as shown in Fig. 49, to rotate with the shaft. This hub has two toothed timing plates fixed thereon to rotate therewith. These timing plates are spaced apart by an intermediate spacer portion formed on the hub, as shown in Fig. 49. The innermost toothed timing plate indicated as 682 controls the cutting off of the fabric. The outermost toothed timing plate controls the "skip feed" of the wire. Each toothed timing plate is provided with three spaced apart teeth 686, as shown in Fig. 48. Each toothed plate is also provided with arcuate slots 688. Studs 690 extend through these slots into the hub 680 and secure the toothed plates thereto to rotate therewith. Through the provision of these arcuate slots and threaded studs angular adjustment of the toothed plates upon the hub is permitted to regulate the functioning of the timing mechanism.

The innermost toothed plate 682 acts upon a limit switch 692 which switch is disposed underneath the toothed plate and is mounted upon the bed plate of the machine, as shown in Fig. 2. This limit switch is provided with a switch lever arm 694 which arm carries at its outer end a roller 696. This roller is held against the periphery of the toothed plate to be tripped by the rotation of the plate and the passing of the teeth 686 over the roller. It is this limit switch that controls the operation of the shears by energizing the solenoid 687.

The outermost toothed plate 684 acts upon a limit switch 698. This switch is disposed at one side of the toothed plate and is mounted upon the web 630 of the timing mechanism support, as shown in Fig. 46. Such limit switch is provided with a switch lever arm 700 which carries at its outer end a roller 702. This roller 702 is held against the periphery of its toothed plate to be tripped by the teeth thereon as they pass thereover. This limit switch controls the solenoid assembly 238 which controls the skip feed of the wire. The toothed plate 684 trips its limit switch 698 which controls the skip feed of the wire slightly ahead of the tripping of the limit switch 692 by the toothed plate 682. Fig. 46 shows the wire feed limit switch tripped while the teeth which will trip the burlap cut off switch is just coming into engagement therewith.

The arcuate face dimension of the teeth 686 on the toothed plate which controls the skip feed of the wire is such that when a tooth is brought into contact with the switch lever roller to throw the switch it remains in contact therewith for such a period of time as to permit the main shaft to complete one revolution. In other words, one revolution of the main shaft moves the tooth on to the roller of the switch lever, but does not advance it sufficiently to carry it completely across. It requires the succeeding revolution of the main shaft to carry the tooth completely beyond the roller. This is for the purpose of insuring that the burlap comes to a complete stop before the shearing operation is commenced.

What we claim is:

1. In mechanism for making wire reinforced fabric spring liners having means for advancing a fabric web in successive steps separated by pauses and having mechanism operating in timed relationship with said means for feeding wire transversely through the web during the pause following each step, said last mechanism operating in timed relationship with said means for cutting off the wire thrust through the fabric and bending an end thereof over a part of the fabric web to hold the web in an extended position along said wire.

2. Mechanism for making wire reinforced fabric strips comprising, in combination, a rotatable shaft, fabric advancing mechanism rotatably coupled with the shaft to respond to the rotation thereof to advance the web step by step with a pause following each step, wire feed mechanism operatively coupled with the shaft to respond to the rotation thereof to advance a wire transversely through the web during the pause following each step of a determined number of steps, wire cut off mechanism operatively coupled with the shaft to respond to the rotation thereof to cut off the wire section thrust through the web, and wire bending mechanism coupled with the shaft to respond to the rotation thereof to bend the cut end of the wire over a margin of the web.

3. In mechanism for reinforcing a fabric web with transverse wires having means for advancing the web and having wire feed mechanism operating in timed relationship with said means for feeding one end of a wire through the web, wire cut off and end shaping mechanism operating in timed relationship with said means to cut off the section of wire thrust through the web and bend an end thereof over a margin of the web, said cut off and end shaping mechanism including a pair of die members operating in timed relationship with said means over one of which dies the wire is initially bent and over the other of which dies the wire is thereafter bent.

4. In mechanism for reinforcing a fabric web with transverse wires having power driven means for advancing the web step by step with a pause following each step and wire feed mechanism driven in synchronism with said means adapted to feed a wire transversely through the web during the pause following each step of a determined number of successive steps and having wire holding mechanism driven in synchronism with said means adapted to grip and hold stationary that section of wire thrust through the web during a portion of the pause following the thrusting of the wire through the web, wire cut off and end shaping mechanism driven in synchronism with said means adapted to cut off that section of wire thrust through the web and while such section is held stationary by the wire holding means, said wire cut off and end shaping mechanism including two die members driven in synchronism with said means and over one of which die members the wire is cut off and partially shaped and over the other of which die members the shaping of the wire is further advanced.

5. In mechanism for reinforcing a fabric strip with transverse wires having a rotatable shaft with fabric advancing mechanism rotatably coupled with the shaft to respond to each revolution thereof to advance the web of fabric a single step with a pause following each step and having wire feed mechanism operatively coupled with the shaft to respond to each revolution thereof to advance one end of a wire transversely through the web during the pause following each step of a determined number of successive steps, wire cut off and end shaping mechanism operatively coupled with the shaft to respond to each revolution thereof to cut off the wire section thrust through the web and bend the ends thereof over a part of the web, said wire cut off and end shaping mechanism including two die members operatively coupled with the shaft to respond to each revolution thereof to be advanced across the path of the wire for the wire to be cut off and partially bent thereover and to be withdrawn from said advanced position to permit completion of the bending of the wire during said revolution of the shaft and means operatively coupled with the shaft to respond to each revolution thereof to complete the bending of the wire.

6. In mechanism for reinforcing a fabric web with transverse wires having means for advancing the web and having wire feed mechanism operating in timed relationship with said means for feeding one end of a wire through the web, wire cut off and end shaping mechanism operating in timed relationship with said means including a pair of wire working plungers operating in timed relationship with said means, one of said plungers adapted to cut off the wire and partially shape the same and the other plunger adapted to complete the bending of the wire over a part of the web.

7. In mechanism for reinforcing a fabric web with transverse wires having means for advancing the web and having wire feed mechanism operating in timed relationship with said mean for feeding one end of a wire through the web, wire cut off and end shaping mechanism operating in timed relationship with said means including a pair of dies and a pair of wire working plungers operating in timed relationship with said means, one of said plungers adapted to cut off and partially bend the end of the wire over said dies and the other plunger adapted to complete the bending of the wire over a part of the web.

8. In mechanism for reinforcing a fabric web with transverse wires having means for advancing the web and having wire feed mechanism operating in timed relationship with said means for feeding one end of a wire through the web, wire cut off and end shaping mechanism operating in timed relationship with said means including a pair of dies and a pair of wire working plungers operating in timed relationship with said means, one of said plungers adatped to cut off and partially bend the end of the wire over one of said dies and then to further bend the end of the wire over the other of said dies and the other plunger adapted to complete the bending of the wire over a part of the web.

9. Mechanism for reinforcing a fabric web with transverse wires comprising, in combination, means for advancing the web, wire feed mechanism operating in timed relationship with said means for feeding one end of a wire through the web, wire cut off and end shaping mechanism operating in timed relationship with said means to cut off the section of wire thrust through the web and bend an end thereof over a part of the web, and web holding mechanism operable to hold that part of the web in proximity to the point where the wire is being bent thereover during the bending operation of the wire thereover.

10. Mecahnism for reinforcing a fabric web with transverse wires comprising, in combination, means for advancing the web, wire feed mechanism operating in timed relationship with said means for feeding one end of a wire through the web, wire cut off and end shaping mechanism operating in timed relationship with said means to cut off the section of wire thrust through the web at both ends of said section and to bend both ends of said section over marginal portions of the web and web stretching mechanism operable to stretch the web transversely between the marginal portions over which the wire is being bent during the time the ends of the wire are being bent thereover and to hold the same stretched adjacent to said portions while the wire is bent thereover.

11. Mechanism for reinforcing a fabric strip with wire comprising, in combination, means for advancing a fabric strip, wire feed mechanism operating in timed relationship with said means for feeding one end of a wire transversely through the strip, wire cut off mechanism operating in timed relationship with said means for cutting off the section of the wire thrust through the strip at both sides of the strip, wire bending mechanism operating in timed relationship with said means to bend both ends of the wire over opposed spaced apart parts of the two margins of the strip.

12. In a mechanism for reinforcing a fabric web with transverse wires and having means for advancing the web step by step and mechanism operating in timed relationship with said means for feeding a wire through the web and having wire cut off and end shaping mechanism operating in timed relationship with said means to cut off a section of wire thrust through the web and bend the opposite ends thereof over the opposite margins of the web, web stretching and holding mechanism operating in timed relationship with said wire bending mechanism to engage the opposite marginal portions of the web and stretch the web transversely and hold the same stretched adjacent to the marginal portions over which the opposite ends of the wire are bent.

13. In a mechanism for reinforcing a fabric web with transverse wires having means for advancing the web step by step and having mechanism operating in timed relationship with said means for feeding a wire through the web during a pause in its advance and having mechanism operating in timed relationship with said means for cutting off sections of wire thrust through the web and bending the ends over the opposite margins of the web, web stretching and holding mechanism coupled with the wire bending mechanism to operate concurrently therewith and comprising pivotally supported members swingable to engage the opposite marginal portions of the web and stretch the web transversely at the time the opposite ends of the wire are bent thereover.

14. In mechanism for reinforcing a fabric web with transverse wires having means for advancing the web step by step and having mechanism operating in timed relationship with said means for feeding a wire transversely through the web during a pause in its advance and cutting off that portion of the wire thrust through the web and bending the ends thereof over the margins of the web, web stretching and holding mechanism comprising a pair of levers pivotally supported to superpose the opposite margins of the web and coupled with the wire bending mechanism to be swingably actuated concurrently with the operation of the wire bending mechanism to engage the opposite margins of the web and stretch the web transversely and hold the same stretched during the bending of the wire over the margins of the web.

15. In mechanism for reinforcing a fabric web with transverse wires having means for advancing the web step by step and having mechanism operating in timed relationship with said means for feeding a wire transversely through the web during a pause in its advance and cutting off that portion of the wire thrust through the web and bending the ends thereof over the margins of the web, said last mechanism including a pair of wire working plungers operating in timed sequence, one of said plungers adapted to cut off the wire and partially shape the same and the other plunger adapted to complete the bending of the wire over the margins of the web, and a web engaging and stretching member coupled with one of said plungers to be actuated concurrently therewith to engage a marginal portion of the web and stretch the web transversely during the time the wire is bent thereover.

16. In mechanism for reinforcing a fabric web with transverse wires having means for advancing the web step by step and having mechanism operating in timed relationship with said means for feeding a wire transversely through the web during a pause in its advance and cutting off that portion of the wire thrust through the web and bending the ends thereof over the margins of the web, said last mechanism including a pair of wire working plungers operating in timed sequence, one of said plungers adapted to cut off the wire and partially shape the same and the other plunger adapted to complete the bending of the wire over the margins of the web, and a web engaging and stretching member pivotally supported and coupled with the last-mentioned plunger to be swung concurrently with the actuation of said plunger to engage the marginal portion of the web and stretch the web transversely and hold the same stretched during the time said plunger acts upon the wire to complete the bending of it about the margins of the web.

17. In mechanism for reinforcing a fabric web with transverse wire having a rotatable shaft and means for advancing the web step by step and having mechanism operating in timed relationship with said means for feeding a wire through the web during a pause in its advance, wire cut off and end shaping mechanism operating in timed relationship with said means for cutting off sections of wire thrust through the web and bending the ends thereof over the opposite margins of the web, said wire cut off and end shaping mechanism including two die members operatively coupled with said shaft to respond to each revolution thereof to be advanced across the path of the wire for the wire to be cut off and partially bent thereover and to be withdrawn from said advanced position to permit completion of the bending of the wire, and further including a pair of plungers coupled with the shaft to respond to each revolution thereof to be advanced in succession, one of said plungers adapted to advance and cut off the wire and bend the same over one die member and upon withdrawal of said die member to continue its advance to further bend the wire over the other die member, said other plunger adapted upon withdrawal of both die members to complete the bending of the wire and clenching of the same through the web.

18. Mechanism for reinforcing a fabric strip with transverse wires having means for advancing the fabric strip and having wire feed mechanism operating in timed relationship with said means for feeding one end of a wire through the strip comprising, in combination, wire cut off mechanism operating in timed relationship with said means for cutting off the section of wire thrust through the strip at both sides of the strip, wire bending mechanism operating in timed relationship with said means to bend both ends of the wire over opposed spaced apart parts of the two margins of the strip, strip holding mechanism operating in timed relationship with said means to engage, stretch and hold marginal parts of the strip over which the wire ends are being bent during the time of such bending.

NEWTON E. SHOCKEY.
HOWARD WENDALL WILKINS.

References Cited in the file of this patent

UNITED STATES PATENTS

| Number | Name | Date |
|---|---|---|
| 1,316,257 | Snell | Sept. 16, 1919 |
| 1,690,100 | Bull | Nov. 6, 1928 |
| 1,930,330 | Wattleworth | Oct. 10, 1933 |
| 1,966,256 | Marinsky | July 10, 1934 |
| 2,053,260 | Blashill | Sept 8, 1936 |
| 2,077,439 | Schmitt | Apr. 20, 1937 |
| 2,099,586 | Williams | Nov. 16, 1937 |
| 2,170,673 | Anderson | Aug. 22, 1939 |
| 2,218,749 | Heilman | Oct. 22, 1940 |
| 2,218,758 | Leal | Oct. 22, 1940 |
| 2,355,796 | Gallwitzer | Aug. 15, 1944 |
| 2,467,565 | Owens et al. | Apr. 19, 1949 |
| 2,467,572 | Weisselberg | Apr. 19, 1949 |